US011283729B2

(12) United States Patent
Gangwar et al.

(10) Patent No.: US 11,283,729 B2
(45) Date of Patent: Mar. 22, 2022

(54) NETWORK-ON-CHIP ELEMENT PLACEMENT

(71) Applicant: Arm Limited, Cambridge (GB)

(72) Inventors: Anup Gangwar, Austin, TX (US); Nitin Kumar Agarwal, Bangalore (IN); Honnahuggi Harinath Venkata Naga Ambica Prasad, Bangalore (IN); Narayana Sri Harsha Gade, Bangalore (IN); Ravishankar Sreedharan, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/094,145

(22) Filed: Nov. 10, 2020

(65) Prior Publication Data

US 2021/0058289 A1     Feb. 25, 2021

Related U.S. Application Data

(63) Continuation-in-part of application No. 17/076,403, filed on Oct. 21, 2020, which is a continuation-in-part of application No. 16/518,254, filed on Jul. 22, 2019, now Pat. No. 10,817,627.

(51) Int. Cl.
*H04L 12/751*     (2013.01)
*H04L 49/109*     (2022.01)
*H04L 41/0803*     (2022.01)
*H04L 45/02*     (2022.01)

(52) U.S. Cl.
CPC ........ *H04L 49/109* (2013.01); *H04L 41/0803* (2013.01); *H04L 45/02* (2013.01)

(58) Field of Classification Search
CPC ... H04L 49/109; H04L 49/90; H04L 41/0803; H04L 41/12; H04L 45/02; H04L 12/4625; H04L 12/4641; H04L 47/24; G06F 15/7825
See application file for complete search history.

(56) References Cited

U.S. PATENT DOCUMENTS

| | | | | |
|---|---|---|---|---|
| 8,819,616 | B2* | 8/2014 | Philip | G06F 13/40 716/138 |
| 9,444,702 | B1* | 9/2016 | Raponi | H04L 43/045 |
| 10,042,404 | B2* | 8/2018 | Gangwar | G06F 1/3296 |
| 10,218,580 | B2* | 2/2019 | Chopra | H04L 41/145 |
| 10,318,243 | B2* | 6/2019 | Gangwar | H04L 49/40 |
| 10,484,267 | B2* | 11/2019 | Gerstel | H04L 41/0668 |
| 10,791,045 | B2* | 9/2020 | Agarwal | H04L 45/02 |

(Continued)

*Primary Examiner* — Naum Levin
(74) *Attorney, Agent, or Firm* — Leveque Intellectual Property Law, PC

(57) ABSTRACT

The present disclosure provides a computer-based method and system for synthesizing a Network-on-Chip (NoC). Physical data, device data, bridge data and traffic data are determined based on an input specification for the NoC. A virtual channel (VC) is assigned to each traffic flow to create a plurality of VC assignments. A topology is generated, based on the physical data, the device data, the bridge data, the traffic data and the VC assignments, which includes bridge ports, routers and connections. Final locations for relocatable NoC elements (e.g., routers, etc.) are determined based on NoC element energy values for the relocatable NoC elements, and protocol-level pipelines may be inserted into the connections based on a timing parameter.

26 Claims, 18 Drawing Sheets

(56) References Cited

U.S. PATENT DOCUMENTS

| | | | | |
|---|---|---|---|---|
| 10,817,627 | B1* | 10/2020 | Agarwal | G06F 30/394 |
| 11,050,672 | B2* | 6/2021 | Prasad | H04L 47/283 |
| 11,121,933 | B2* | 9/2021 | Cherif | H04L 41/0803 |
| 2015/0109024 | A1* | 4/2015 | Abdelfattah | G06F 30/34 |
| | | | | 326/41 |
| 2015/0178435 | A1* | 6/2015 | Kumar | G06F 30/327 |
| | | | | 716/114 |
| 2018/0227180 | A1* | 8/2018 | Rao | G06F 15/7825 |
| 2020/0267073 | A1* | 8/2020 | Agarwal | H04L 45/02 |
| 2021/0036959 | A1* | 2/2021 | Cheng | H04L 47/2433 |
| 2021/0036967 | A1* | 2/2021 | Agarwal | G06F 15/7825 |
| 2021/0168038 | A1* | 6/2021 | Gade | H04L 45/02 |

\* cited by examiner

NETWORK-ON-CHIP ELEMENT PLACEMENT

CROSS-REFERENCE TO RELATED APPLICATIONS

This application is a continuation-in-part (CIP) of U.S. patent application Ser. No. 17/076,403 (filed on Oct. 21, 2020), which is a continuation-in-part (CIP) of U.S. patent application Ser. No. 16/518,254 (filed on Jul. 22, 2019; now U.S. Pat. No. 10,817,627), the disclosures of which are incorporated herein by reference in their entireties.

BACKGROUND

The present disclosure relates to a network. More particularly, the present disclosure relates to a Network-on-Chip (NoC).

A NoC is a network-based communication subsystem implemented on an integrated circuit (IC), such as a System-on-Chip (SoC), that enables IC modules to exchange data more effectively than conventional bus or crossbar architectures. More particularly, a NoC is a router-based packet switching network that connects IC modules, such as intellectual property (IP) cores. A NoC includes various components, such as routers, power clock domain crossing (PCDC) buffers, resizers or serializers/deserializers (SerDes's), pipeline elements, etc. NoC synthesis is a process that lays out and configures NoC components on the IC based on a NoC input specification. Generally, the NoC design must accommodate the data or traffic communicated between IC modules while satisfying various design constraints, such as power, performance and area (PPA), wiring cost, timing, etc., that may conflict with one another.

NoC synthesis includes, inter alia, generating the topology for the NoC, which is the general arrangement of routers, connections, and traffic paths or routes between IC modules, as well as determining the placement of the NoC elements within the available area on the SoC. A poorly-designed NoC can significantly impact the NoC's PPA, wiring cost, etc., and may fail to meet the SoC's timing and area specifications due to poor NoC element placement.

DETAILED DESCRIPTION

Figure 1:
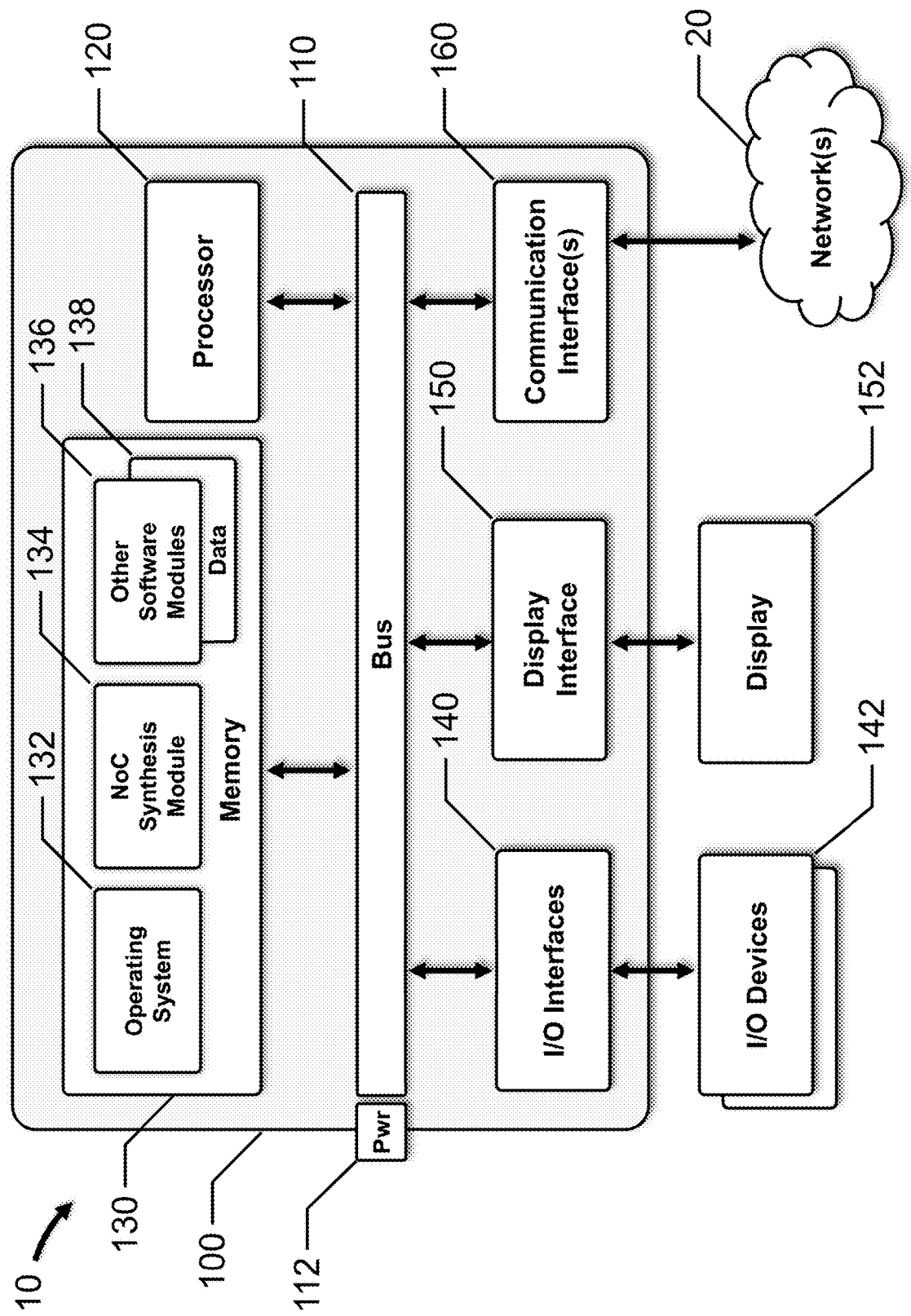
FIG. 1 depicts a block diagram of a NoC synthesis system, in accordance with an embodiment of the present disclosure.

Embodiments of the present disclosure will now be described with reference to the drawing figures, in which like reference numerals refer to like parts throughout.

Embodiments of the present disclosure advantageously provide a computer-based method and system for synthesizing a NoC. More particularly, embodiments of the present disclosure advantageously determine the placement of the NoC elements to minimize the overall slack (i.e., the difference between a required time and an arrival time) while honoring latency sensitive traffic, and insert protocol-level pipelines to satisfy timing considerations.

In one embodiment, a computer-based method for synthesizing a Network-on-Chip (NoC) is provided. Physical data, device data, bridge data and traffic data are determined based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows. A virtual channel (VC) is assigned to each traffic flow to create a plurality of VC assignments. A topology is generated based on the physical data, the device data, the bridge data, the traffic data and the VC assignments, the topology including the plurality of bridge ports, a plurality of routers and a plurality of connections, each router having an initial location. Final locations for a plurality of relocatable NoC elements are determined based on NoC element energy values for the relocatable NoC elements, the plurality of relocatable NoC elements including the routers. One or more protocol-level pipelines are inserted into one or more connections based on a timing parameter.

FIG. 1 depicts a block diagram of NoC synthesis system 10, in accordance with an embodiment of the present disclosure.

Computer 100 includes bus 110, processor 120, storage element or memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 20 using a wired or wireless connection.

Bus 110 is a communication system that transfers data between processor 120, memory 130, I/O interfaces 140, display interface 150, and communication interface 160, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, NoC synthesis module 134, other software modules 136, etc., stored within memory 130.

Generally, memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. The software modules also include NoC synthesis module 134 that provides functionality for synthesizing the NoC architecture. In certain embodiments, NoC synthesis module 134 may include a plurality of modules, each module providing specific individual functionality for synthesizing the NoC architecture, such as, for example, an input module, a VC module, a topology module, a routing module, a network generation module, a PCDC module, a link size and resizer module, a relocation, pipeline and timing module, an output module, etc. Other software modules 136 may cooperate with NoC synthesis module 134 to provide functionality for synthesizing the NoC architecture.

Data 138 may include data associated with operating system 132, NoC synthesis module 134, other software modules 136, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 20 using one or more wired and/or wireless connections. Network 20 may include one or more local area networks, wide area networks, the Internet, etc., which may execute various network protocols, such as, for example, wired and/or wireless Ethernet, Bluetooth, etc. Network 20 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 2:
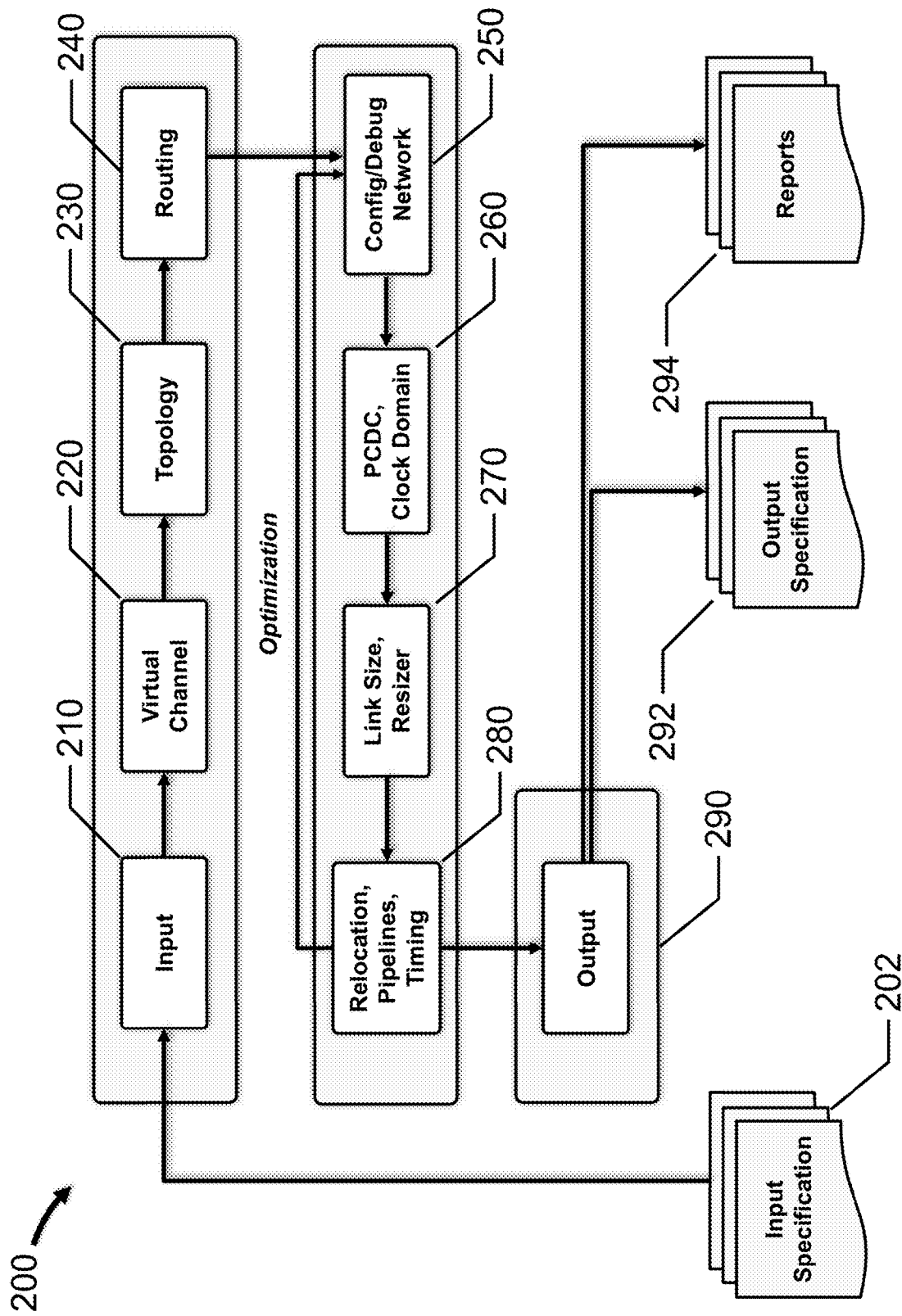
FIG. 2 depicts a NoC synthesis flow diagram, in accordance with an embodiment of the present disclosure.

FIG. 2 depicts NoC synthesis flow diagram 200, in accordance with an embodiment of the present disclosure.

As discussed above, the software modules include NoC synthesis module 134 that provides functionality for synthesizing the NoC architecture. In certain embodiments, NoC synthesis module 134 includes a plurality of modules, each module providing specific individual functionality for synthesizing the NoC architecture, such as, for example, an input module, a VC assignment module, a topology module, a routing module, a network generation module, a PCDC module, a link size and resizer module, a relocation, pipeline and timing component module, an output module, etc.

At 210, NoC input specification 202 is retrieved from memory 130 and design information for the NoC is determined. For example, NoC input specification 202 may be received over network 20 and then stored as data 138 in memory 130. In another example, NoC input specification 202 may be created by a NoC designer using one or more software modules 136, and then stored as data 138 in memory 130.

Design information for the NoC includes, for example, physical data, device data, bridge data, traffic data, etc. Additional design information may include voltage domain data, power domain data, clock domain data, address region data, synthesis constraints, etc.

Physical data include the dimensions for the NoC and a list of unrouteable areas. NoC components, such as bridges, routers, PCDC buffers, resizers, pipelines, connections, etc., are not typically located within unrouteable areas. In one example, the NoC is modeled as an array of cells arranged in rows and columns. The number of rows is defined by a height (in cells), and the number of columns is defined by a width (in cells). A cell width, in millimeters, micrometers, inches, etc., may also be provided. The cells are numbered sequentially, starting in the upper left corner of the array. Data for each unrouteable area include a location (cell number) and dimensions, such as a width (in cells) and a height (in cells). In another example, the NoC is modeled as a grid defined by cartesian coordinates (X, Y), with the origin located in the lower left corner of the grid. The height and the width are provided in normalized units, and a normalization factor may also be provided. Data for each unrouteable area include a location (X,Y) and dimensions, such as a width (X) and a height (Y).

Device data include a list of devices, such as IP cores, IC modules, etc., located within the NoC. Each device includes one or more bridge ports (i.e., signal interfaces). Data for each device may include a name, a location (cell number, X-Y coordinates, etc.), dimensions including a width (in cells, X dimension, etc.) and a height (in cells, Y dimension, etc.), a power domain, etc.

Bridge data include a list of bridge ports for the devices. Data for each bridge port may include a name, an associated device name, a location (cell number, X-Y coordinates, etc.), a data width (in bits), a low/high wire indicator, etc.

In many embodiments, the NoC is a packet-switched network that divides data packets into a sequence of message flow control units or flits. Each flit has the same size (in bits), and is divided into a sequence of data transfers across a physical connection or link. A physical unit, or phit, is the number of bits that can be transferred in parallel in a single data transfer cycle across the physical connection, i.e., the bitwidth of the link. In one example, the flit size for a link is 128 bits. A bridge port having a data width (phit size) of 32 bits needs 4 data transfer cycles to transfer each flit. In the context of the present disclosure, the link size for this bridge port is 4 (each unit of link size is 32 bits). Similarly, a bridge port having a data width of 16 bits needs 8 data transfer cycles to transfer each flit and has a link size of 8 (each unit of link size is 16 bits), while a bridge port having a data width of 64 bits needs 2 data transfer cycles to transfer each flit and has a link size of 2 (each unit of link size is 64 bits). Other flit sizes, such as, for example, 32 bits, 64 bits, 256 bits, 512 bits, etc. may also be used. Different flow control techniques may be used in alternative embodiments.

Traffic data include a list of traffic flows for the NoC. Data for each traffic flow include a source bridge port, a destination bridge port, a peak traffic rate, an average traffic rate, and a traffic class. The source bridge port and the destination bridge port are included within the list of bridge ports. The peak traffic rate and the average traffic rate are provided in bits or bytes per second, such as, for example, b/s, kb/s, Mb/s, Gb/s, Tb/s, etc., B/s, KB/s, MB/s, GB/s, TB/s, etc. Generally, the traffic class provides one or more metrics that differentiate the level of NoC performance that may be provided for each traffic flow. In many embodiments, the traffic class includes a quality of service (QoS) metric and a latency sensitivity (LS) metric. The QoS metric provides a mechanism to prioritize traffic within the NoC, while the LS metric indicates the sensitivity of the traffic to network delays. For example, for an integer QOS metric with four possible values (e.g., 0 to 3) and a Boolean LS metric with two possible values (e.g., true or false), 8 different traffic classes are provided. In this example, a QoS value of 0 and an LS value of true provides the best potential NoC performance. Other metrics are also contemplated. Additionally, a message type may also be provided, such as, for example, a read request, a write request, a read/write request, etc.

Figure 3:
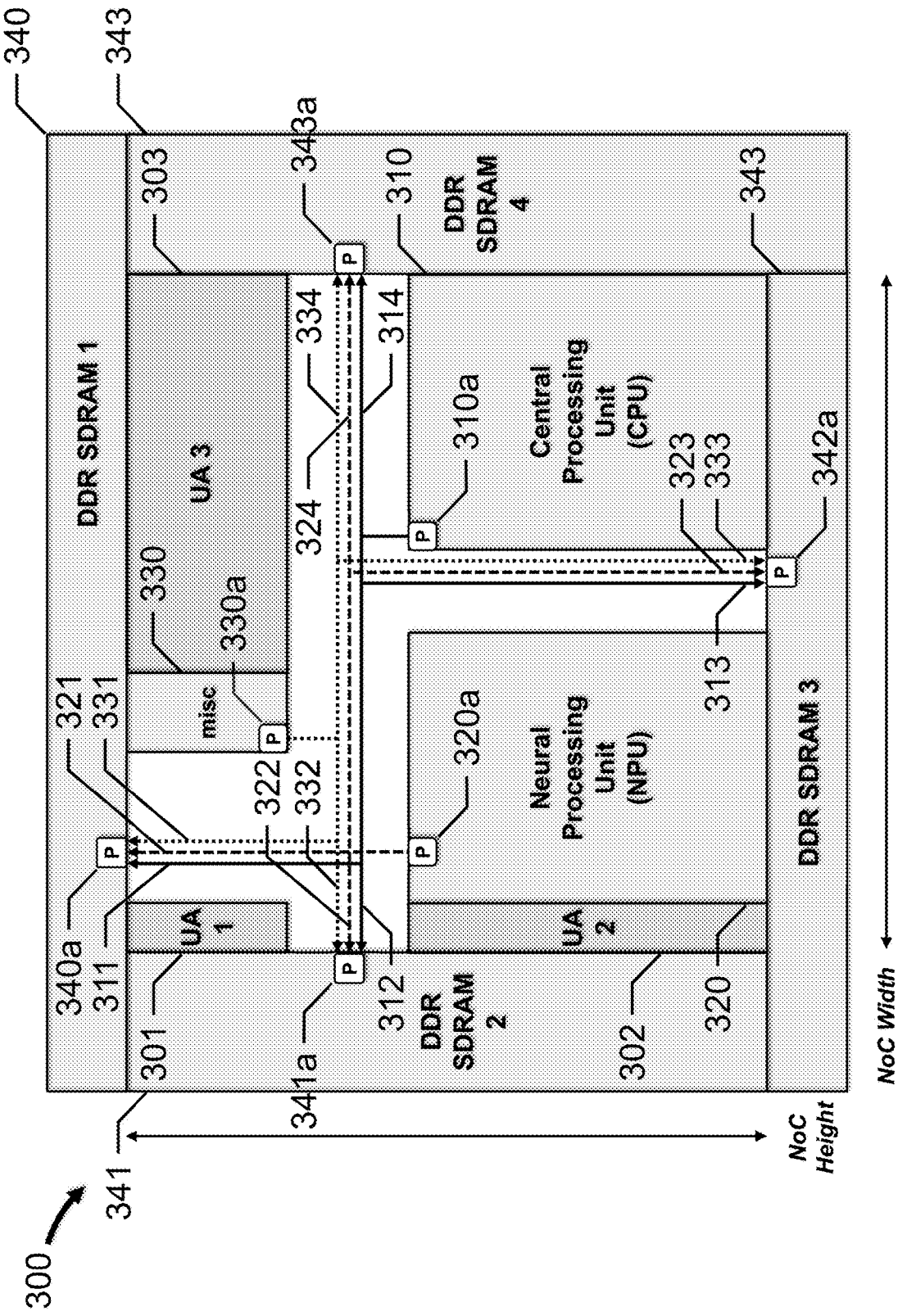
FIG. 3 depicts a graphical representation of a NoC input specification, in accordance with an embodiment of the present disclosure.

FIG. 3 depicts a graphical representation of NoC input specification 202, in accordance with an embodiment of the present disclosure. A user may view NoC 300 on display 152.

NoC 300 has a NoC height and a NoC width and includes several areas that are not available for NoC element placement, wire routes, etc., i.e., unrouteable areas (UAs) 301, 302 and 303, device 310, device 320 and device 330. Four additional devices are located along the periphery of NoC 300, i.e., devices 340, 341, 342 and 343. Each device includes at least one bridge port ("P"). For ease of illustration, each device has a single bridge port. Device 310 (e.g., a central processing unit or CPU) includes bridge port 310a, device 320 (e.g., a neural processing unit or NPU) includes bridge port 320a, device 330 (e.g., miscellaneous processing circuitry) includes bridge port 330a, device 340 (e.g., double data rate synchronous dynamic random-access memory or DDR SDRAM 1) includes bridge port 340a, device 341 (e.g., DDR SDRAM 2) includes bridge port 341a, device 342 (e.g., DDR SDRAM 3) includes bridge port 342a, and device 343 (e.g., DDR SDRAM 4) includes bridge port 343a.

Generally, the location of each bridge port is limited by the location of the associated device and the footprint of the device within the NoC, i.e., the device width and height. For example, for an 8 cell×8 cell NoC, a device located at cell number 9 having a width of 1 cell and a height of 3 cells supports one or more bridge ports located at cell numbers 9, 17 and/or 25.

Twelve sets of traffic flows between the devices are depicted; each traffic flow set includes at least one traffic flow. For example, a traffic flow set may include a traffic flow that defines a read request and a traffic flow that defines a write request. With respect to bridge port 310a, traffic flow set 311 flows between bridge port 310a and bridge port 340a, traffic flow set 312 flows between bridge port 310a and bridge port 341a, traffic flow set 313 flows between bridge port 310a and bridge port 342a, and traffic flow set 314 flows between bridge port 310a and bridge port 343a. With respect to bridge port 320a, traffic flow set 321 flows between bridge port 320a and bridge port 340a, traffic flow set 322 flows between bridge port 320a and bridge port 341a, traffic flow set 323 flows between bridge port 320a and bridge port 342a, and traffic flow set 324 flows between bridge port 320a and bridge port 343a. With respect to bridge port 330a, traffic flow set 331 flows between bridge port 330a and bridge port 340a, traffic flow set 332 flows between bridge port 330a and bridge port 341a, traffic flow set 333 flows between bridge port 330a and bridge port 342a, and traffic flow set 334 flows between bridge port 330a and bridge port 343a.

Referring back to FIG. 2, at 220, a VC is assigned to each traffic flow. Generally, VCs are assigned to reduce conflicts and simplify the subsequent topology generation. In one embodiment, the VCs are assigned using an iterative estimation process that performs a specify-evaluate-refine loop until no significant improvement in the estimations are generated. Other assignment methodologies are also contemplated.

At 230, a topology for the NoC is determined.

First, an HCG is constructed based on the traffic data and the VC assignments.

Figure 4:
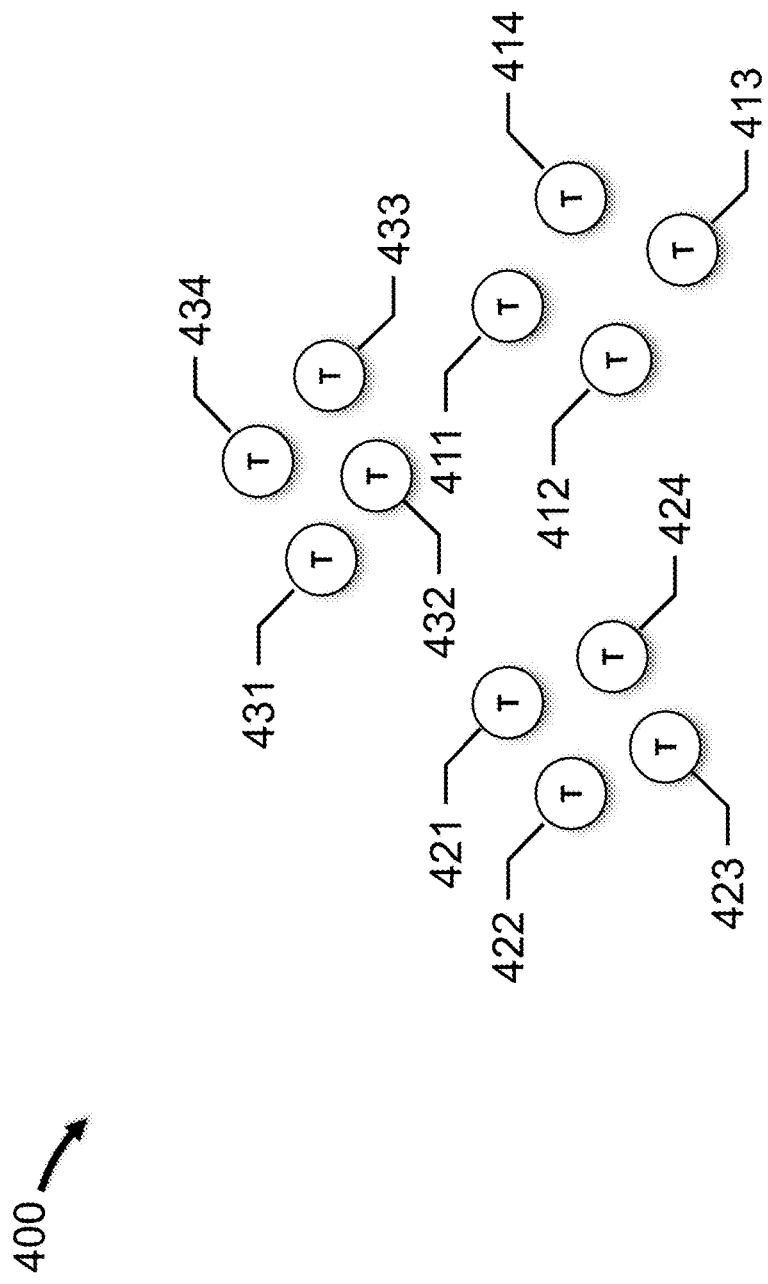
FIG. 4 depicts an HoL conflict graph (HCG) for a NoC, in accordance with an embodiment of the present disclosure.

FIG. 4 depicts HCG 400 for NoC 300, in accordance with an embodiment of the present disclosure. A user may view HCG 400 on display 152.

HCG 400 includes traffic nodes 411, 412, 413, 414, 421, 422, 423, 424, 431, 432, 433 and 434; for purposes of illustration, there are no HoL edges. Each traffic node represents a traffic flow and each HoL edge represents an HoL conflict. An HoL conflict is defined as two traffic flows that are assigned to the same VC but have different traffic classes, such as, for example, different QoS values and/or different LS values. For the purpose of illustration only, each traffic flow set 311, 312, 313, 314, 321, 322, 323, 324, 331, 332, 333 and 334 has a single traffic flow, which results in twelve traffic nodes 411, 412, 413, 414, 421, 422, 423, 424, 431, 432, 433 and 434. A color is then assigned to each traffic node 411, 412, 413, 414, 421, 422, 423, 424, 431, 432, 433 and 434 to minimize HoL conflicts, with adjacent traffic nodes receiving different colors. In certain embodiments, minimum vertex coloring is used to find the minimum number of colors to assign to traffic nodes 411, 412, 413, 414, 421, 422, 423, 424, 431, 432, 433 and 434. For purposes of illustration, all twelve traffic nodes have been assigned one color (white).

A TG for each color is constructed based on the physical data, the bridge data, the traffic data, and the HCG. In other words, a plurality of traffic graphs are constructed based on the physical data, the bridge data, the traffic data and the HCG.

Figure 5A:
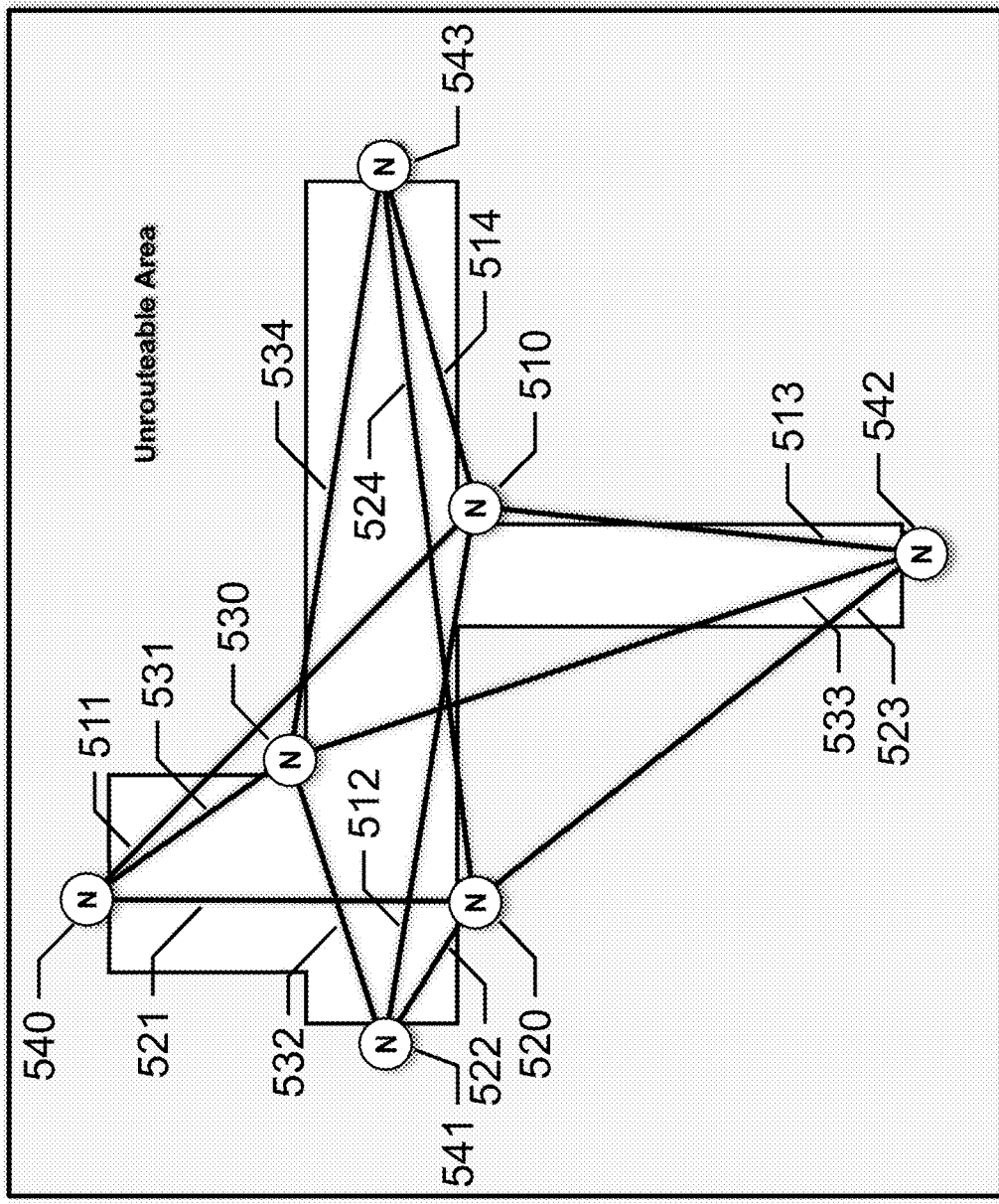
FIGS. 5A to 5G depict a series of graphs, grids and topologies for the TG depicted in FIG. 4, in accordance with an embodiment of the present disclosure.

FIG. 5A depicts TG 500 for NoC 300, in accordance with an embodiment of the present disclosure. TG 500 includes the single color from HCG 400, and a user may view TG 500 on display 152. Similar to UAs 301, 302 and 303, the areas occupied by devices 310, 320 and 330 are also unrouteable areas for NoC 300; devices 340, 341, 342 and 343 are located along the periphery of NoC 300 and are also depicted as unrouteable areas.

TG 500 includes nodes 510, 520, 530, 540, 541, 542 and 543, and edges 511, 512, 513, 514, 521, 522, 523, 524, 531, 532, 533 and 534. Each node 510, 520, 530, 540, 541, 542 and 543 is associated with a different bridge port, and each edge 511, 512, 513, 514, 521, 522, 523, 524, 531, 532, 533 and 534 connects pairs of nodes and is associated with a set of traffic flows between two bridge ports. As discussed above, each set of traffic flows includes at least one traffic flow.

More particularly, node 510 is associated with bridge port 310a, node 520 is associated with bridge port 320a, node 530 is associated with bridge port 330a, node 540 is associated with bridge port 340a, node 541 is associated with bridge port 341a, node 542 is associated with bridge port 342a, and node 543 is associated with bridge port 343a. Similarly, edge 511 is associated with traffic flow set 311, edge 512 is associated with traffic flow set 312, edge 513 is associated with traffic flow set 313, edge 514 is associated with traffic flow set 314, edge 521 is associated with traffic flow set 321, edge 522 is associated with traffic flow set 322, edge 523 is associated with traffic flow set 323, edge 524 is associated with traffic flow set 324, edge 531 is associated with traffic flow set 331, edge 532 is associated with traffic flow set 332, edge 533 is associated with traffic flow set 333, and edge 534 is associated with traffic flow set 334.

The candidate topology for each color is generated based on the respective TG. In other words, a candidate topology is generated for each TG. The candidate topology includes bridge ports, routers and connections. In this embodiment, one candidate topology is generated from a single TG.

FIGS. 5B to 5G depict a series of grids and topologies for TG 500, and a user may view these grids and topologies on display 152.

First, a grid is generated based on the TG. The grid includes nodes and intersections that are formed by grid lines passing through each node. Each node is associated with a different bridge port and is located at a different intersection. In one embodiment, the grid is a Hanan grid formed by orthogonal vertical and horizontal grid lines. Other types of grids may also be generated, such as, for example, a lattice, a square or unit distance grid, etc.

Figure 5B:
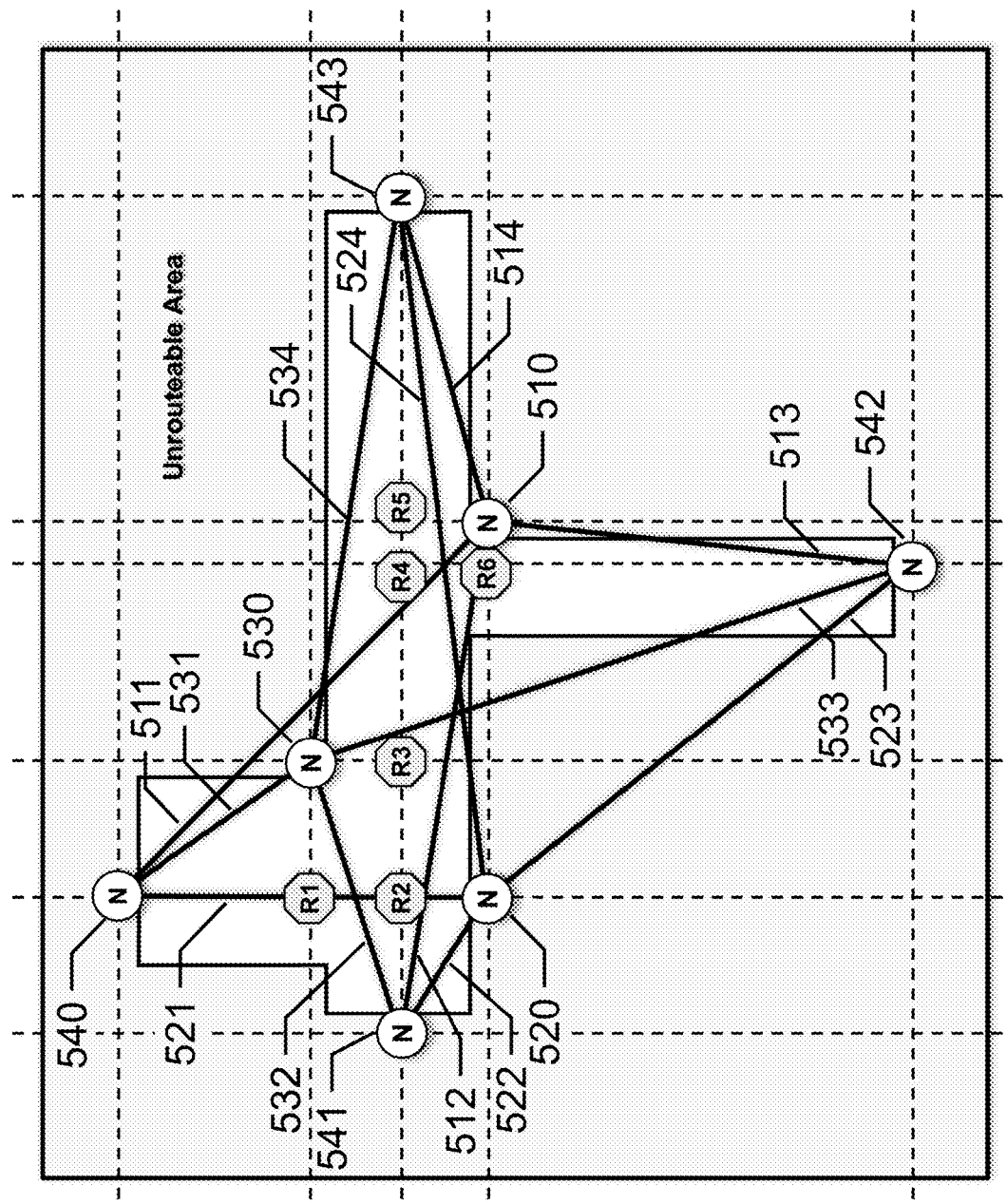

FIG. 5B depicts Hanan grid 501 for TG 500.

Nodes 510, 520, 530, 540, 541, 542 and 543 are first located at respective intersections, and then routers are added to the grid. Each router is located at an intersection not occupied by a node; however, routers are not located in unrouteable areas. FIG. 5B also depicts routers R1 to R6 located at each intersection of Hanan grid 501 not occupied by one of nodes 510, 520, 530, 540, 541, 542 and 543. Adjacent nodes and routers are then connected to create an initial mesh or topology.

Figure 5C:
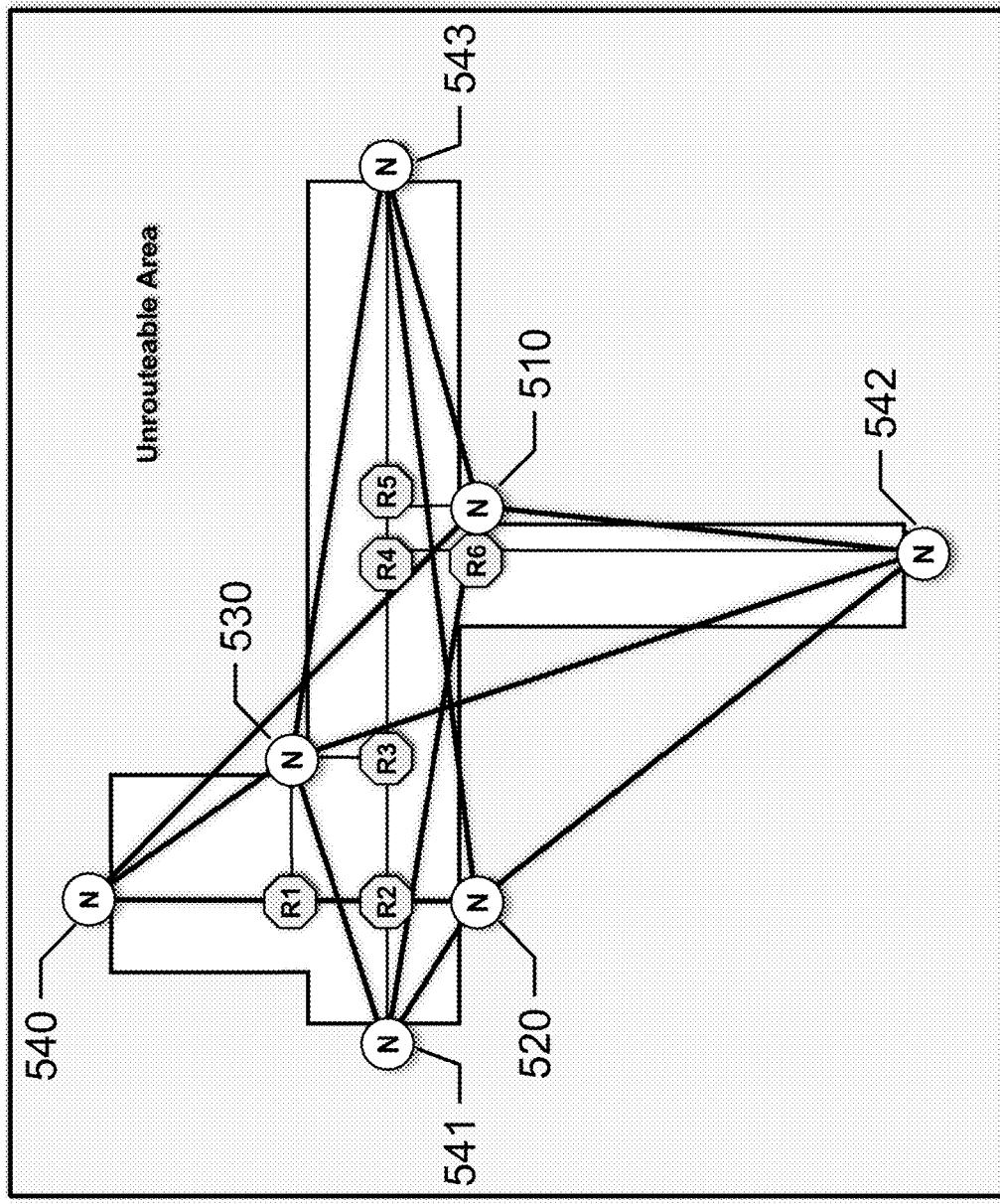

FIG. 5C depicts an initial mesh or topology 502 for TG 500. Node 510 is connected to routers R5 and R6, node 520 is connected to router R2, node 530 is connected to routers R1 and R3, node 540 is connected to router R1, node 541 is connected to router R2, node 542 is connected to router R6, and node 543 is connected to router R5. Router R1 is connected to nodes 530 and 540 and router R2, router R2 is connected to nodes 520 and 541 and routers R1 and R3, router R3 is connected to node 530 and routers R2 and R4, router R4 is connected to routers R3, R5 and R6, router R5 is connected to nodes 510 and 543 and router R4, and router R6 is connected to nodes 510 and 542 and router R4.

A weight is then calculated for each connection, based on the traffic data, to create a weighted mesh or topology. In one embodiment, a traffic criticality index (TCI) is calculated for each traffic flow, and the TCI for each traffic flow is then added to a heating index for each connection that falls within a rectilinear bounding box for that traffic flow. The TCI may be based on traffic criticality and rate. A full or partial rectilinear bounding box for a particular traffic flow is defined by the source node (source bridge port) and the destination node (destination bridge port) of that traffic flow.

In one embodiment, the weight for each connection is inversely proportional to the heating index for that connection, while in another embodiment, the weight is proportional to the heating index. The weights are then applied to the initial mesh or topology to create the weighted mesh or topology.

Figure 5D:
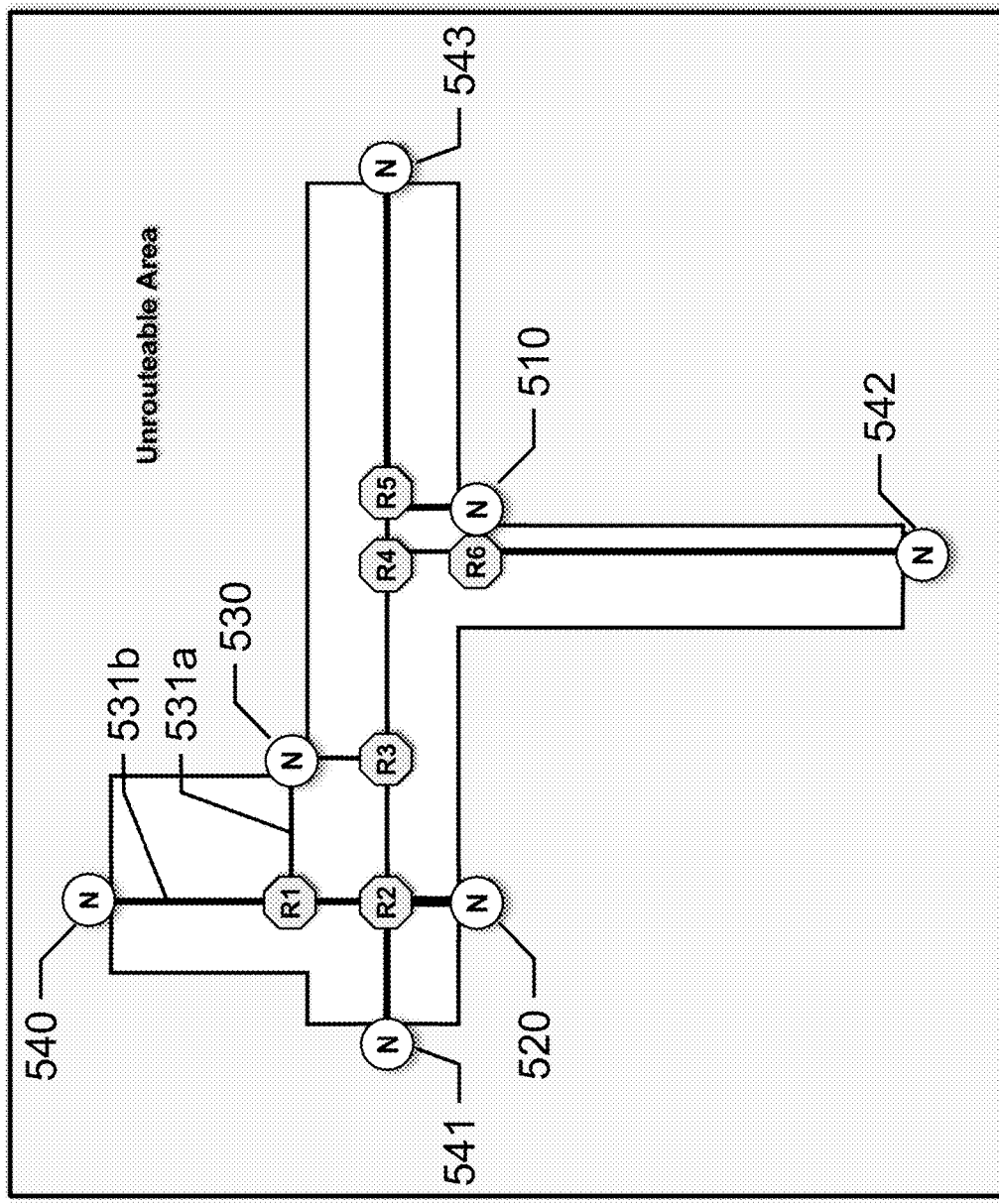

FIG. 5D depicts a weighted mesh or topology 503 for TG 500. The different weights for each connection are represented by different line thicknesses. The thinnest lines represent connections through which traffic does not flow. For example, edge 531 is associated with traffic flow set 331, which includes at least one traffic flow between node 530 (bridge port 330a) and node 540 (bridge port 340a). The partial rectilinear bounding box for edge 531 is defined by node 530 and node 540, represented by connections 531a and 531b. The weight for connection 531a is the lowest, and the weight for connection 531b is greater than the weight for connection 531a. Notably, the weight for connection 531b includes a contribution from edge 521, which is associated with traffic flow set 321 which includes at least one traffic flow between node 520 (bridge port 320a) and node 540 (bridge port 340a), and a contribution from edge 511, which is associated with traffic flow set 311 which includes at least one traffic flow between node 510 (bridge port 310a) and node 540 (bridge port 340a).

A degree-constrained minimum-cost mesh or topology is then determined based on the weighted mesh or topology, including removing one or more connections and one or more routers. In one embodiment, a degree-constrained minimum-cost Steiner tree is determined, which generates a plurality of trees, based on the degree and the number of nodes, and then selects the lowest cost tree. The connections and routers through which traffic does not flow are then removed from the degree-constrained minimum-cost mesh or topology.

Figure 5E:
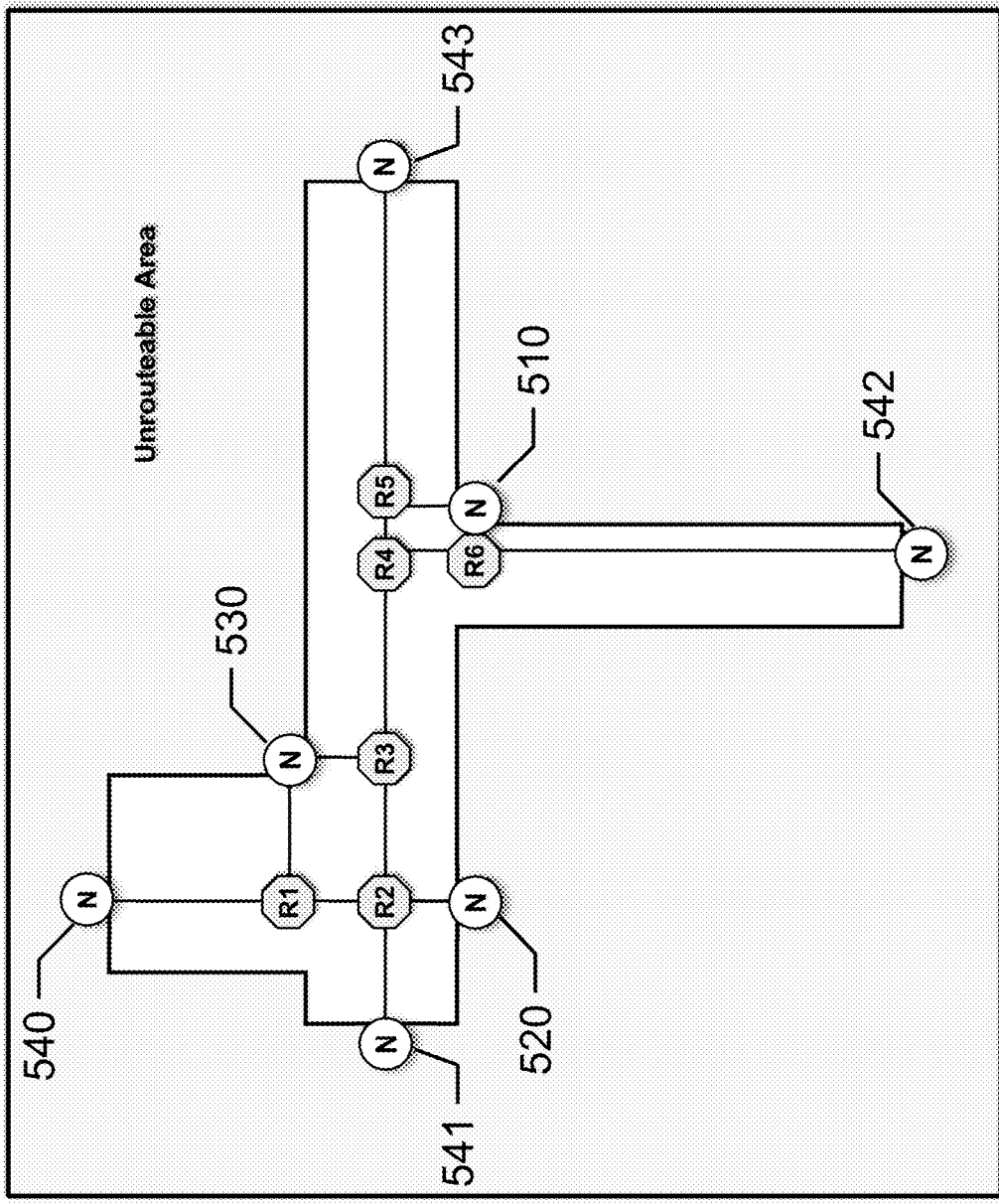

FIG. 5E depicts a degree-constrained minimum-cost mesh or topology 504 for TG 500. Degree-constrained minimum-cost topology 504 includes nodes 510, 520, 530, 540, 541, 542 and 543, and routers R1 to R6.

In this embodiment, the degree-constrained minimum-cost topology 504 is the same as the initial topology 502 depicted in FIG. 5C. Node 510 is connected to routers R5 and R6, node 520 is connected to router R2, node 530 is connected to routers R1 and R3, node 540 is connected to router R1, node 541 is connected to router R2, node 542 is connected to router R6, and node 543 is connected to router R5. Router R1 is connected to nodes 530 and 540 and router R2, router R2 is connected to nodes 520 and 541 and routers R1 and R3, router R3 is connected to node 530 and routers R2 and R4, router R4 is connected to routers R3, R5 and R6, router R5 is connected to nodes 510 and 543 and router R4, and router R6 is connected to nodes 510 and 542 and router R4.

A candidate topology is then generated from the degree-constrained minimum-cost topology. In this embodiment, the candidate topology is the same as the degree-constrained minimum-cost topology 504. The candidate topology includes nodes 510, 520, 530, 540, 541, 542 and 543, and routers R1 to R6. A user may view grid 501 and topologies 502 to 504 on display 152.

Generally, the candidate topologies are then merged to create a merged candidate topology, and the routers are merged within the merged candidate topology to generate the final topology. In this embodiment, one candidate topology was generated, which is the merged candidate topology.

Figure 5F:
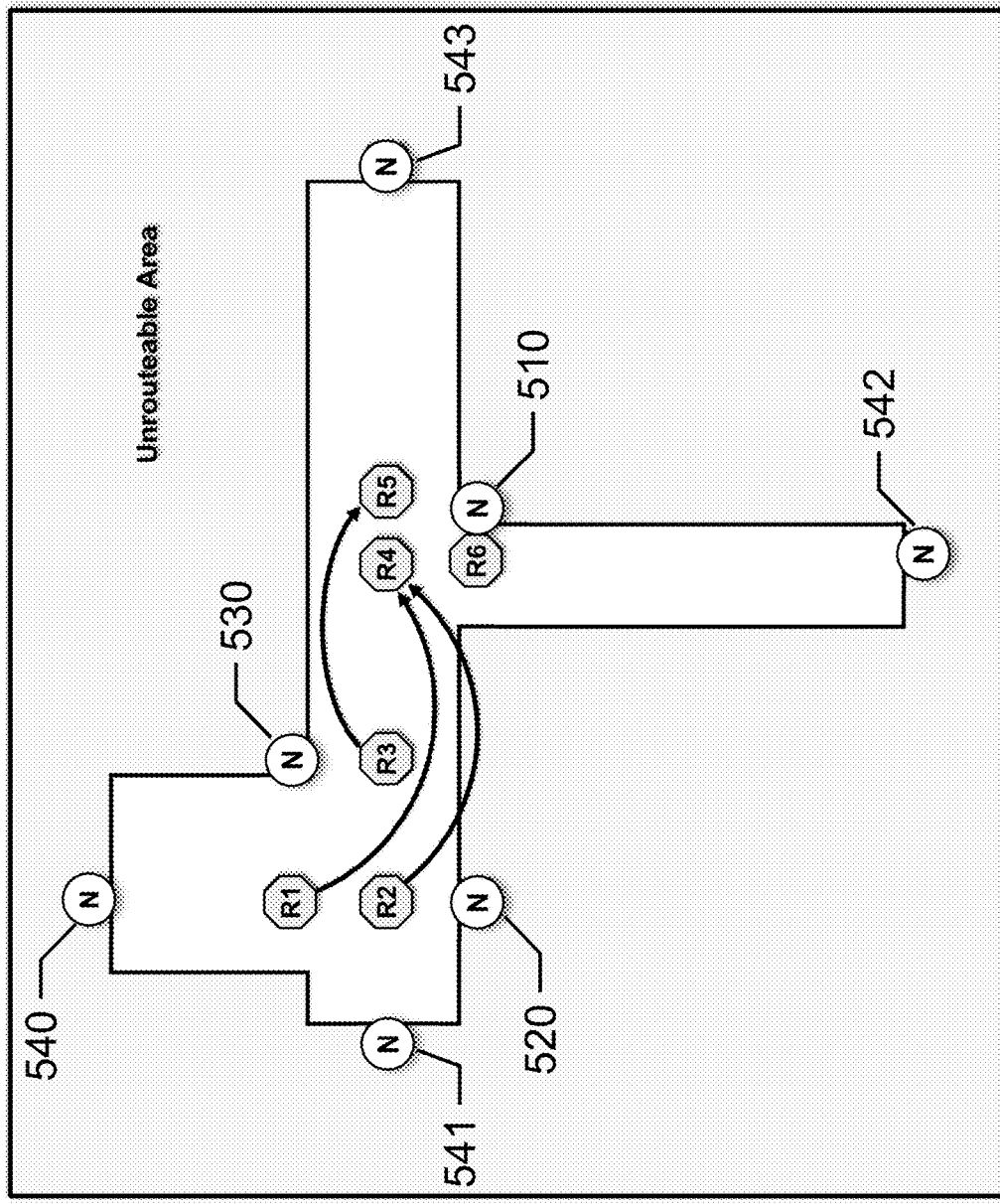

FIG. 5F depicts router merging for the merged candidate topology, in accordance with an embodiment of the present disclosure. Router merging diagram 505 illustrates a process for merging routers in the merged candidate topology. Generally, routing merging reduces the number of routers in the topology by merging or combining two or more routers into a single router. Routers R1 and R2 have been merged into R4, and router R3 has been merged into router R5. Each router R4, R5 and R6 has an initial location and is relocatable, as discussed below.

Figure 5G:
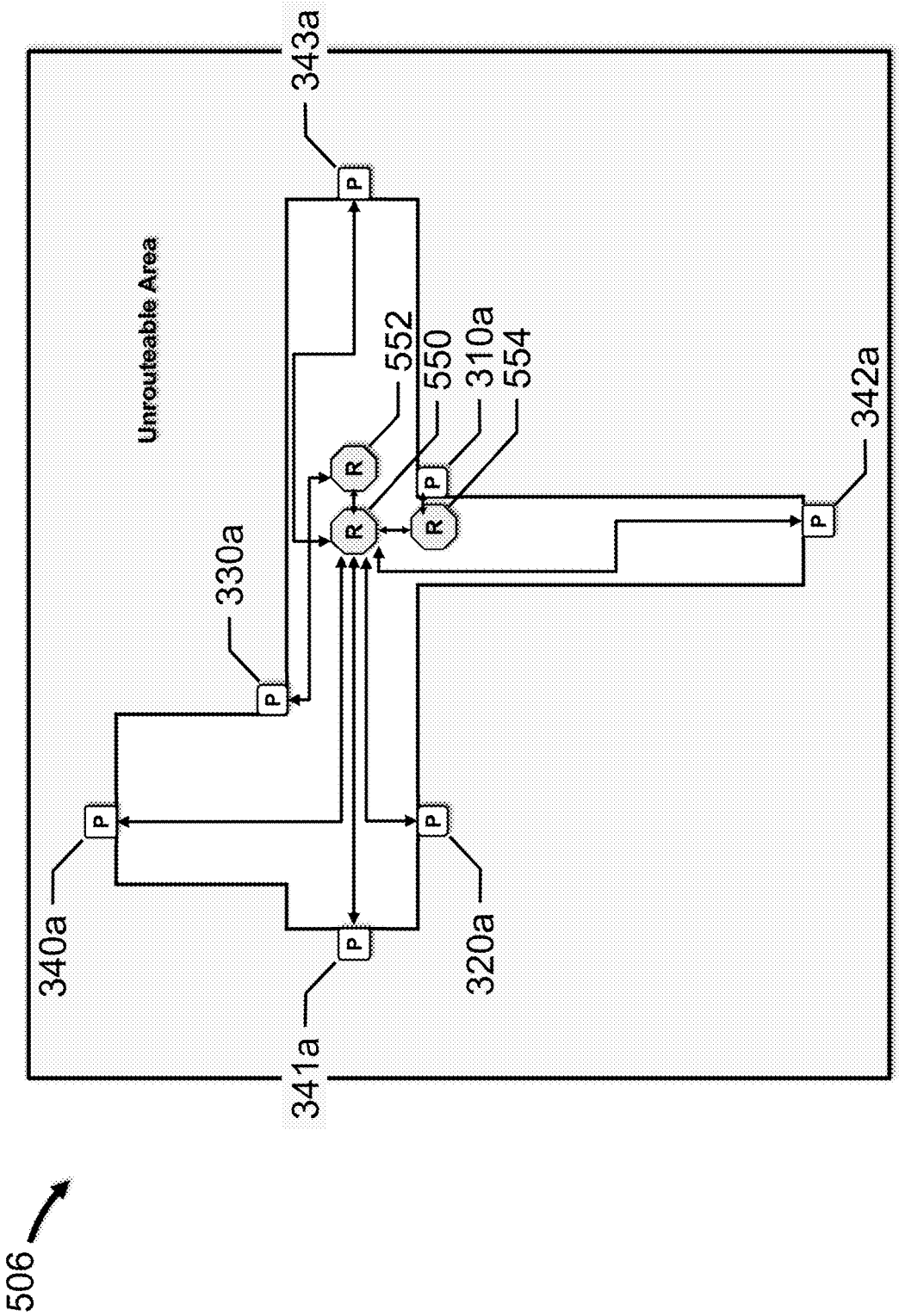

FIG. 5G depicts final topology 506 for NoC 300, in accordance with an embodiment of the present disclosure. A user may view final topology 506 on display 152. Final topology 506 has the same NoC height and width as NoC 300.

Device 310 is connected to router 554 through bridge port 310a. Device 320 is connected to router 550 through bridge port 320a. Device 330 is connected to router 552 through bridge port 330a. Device 340 is connected to router 550 through bridge port 340a. Device 341 is connected to router 550 through bridge port 341a. Device 342 is connected to router 550 through bridge port 342a. Device 343 is connected to router 550 through bridge port 343a.

Referring back to FIG. 2, at 240, a route for each traffic flow is determined. In one embodiment, shortest path routing is used, with optional constraints to disallow cycles in the generated topology. Different routing methodologies may be employed, such as, for example, XY-YX routing, turn prohibition routing, etc. In certain embodiments, clock domains may be determined and assigned based on traffic flows and topology.

At 250, a configuration/debug network is generated. The configuration/debug network includes bridge ports, routers, connections and routes. In one embodiment, the configuration/debug network mimics the data-network. Additionally, the configuration/debug network may be independently optimized in a manner similar to the data-network. The latency and performance of the configuration/debug network are typically relaxed in order to produce the simplest design with the lowest area.

At 260, a PCDC buffer is added to a connection between a bridge or router in a one clock domain and an adjacent bridge or router in a different clock domain. Each PCDC buffer has an initial location and is relocatable, as discussed below.

At 270, a link size is determined for each router in each route, and a resizer (e.g., SerDes) may be added between a bridge and a router with different link sizes or between adjacent routers with different link sizes. Generally, link sizes are determined using bridge data, traffic data, VC assignments and the topology in order to collectively meet average traffic performance requirements and to individually meet peak traffic performance requirements. Additionally, the number of resizers or SerDes's added to the NoC is minimized in order to reduce the latency encountered by the traffic flows. In certain embodiments, certain bridge ports may be allowed to peak concurrently. Each resizer has an initial location and is relocatable, as discussed below.

Figure 6:
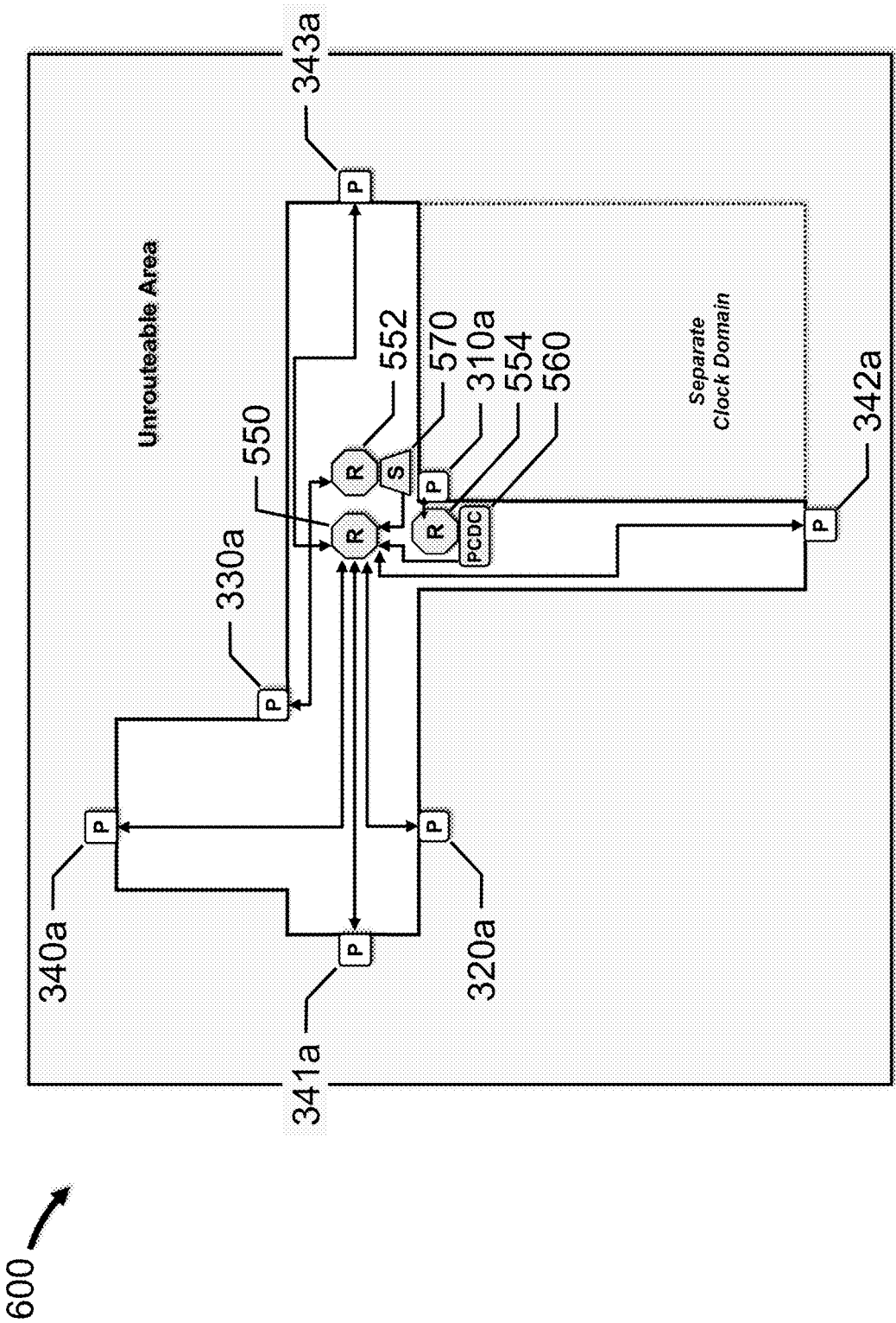
FIG. 6 depicts a NoC topology that includes multiple clock domains, in accordance with an embodiment of the present disclosure.

FIG. 6 depicts NoC topology 600 that includes multiple clock domains, a PCDC buffer and a resizer (e.g., SerDes), in accordance with an embodiment of the present disclosure.

Device 310 resides in a first clock domain, while devices 320, 330, 340, 341, 342 and 343 reside in a second clock domain. In this embodiment, PCDC 560 has been added to the connection between router 554 and router 550, and resizer 570 has been added to the connection between router 552 and router 550. Router 554 resides within the first clock domain, while routers 550 and 552 and resizer 570 reside within the second clock domain.

In many embodiments, NoC topology 600 is determined by NoC synthesis module 134 based on the method described above. In other embodiments, NoC topology 600 may be developed by a different software module 136, a different computer system, etc., and retrieved from memory 130, received by computer 100, etc. In other words, in these embodiments, determining the final locations of the relocatable NoC elements at 280 is independent of the method used to generate the NoC topology.

At 280, the final locations of one or more relocatable NoC elements are determined based on NoC element energy values. Generally, the placement of the relocatable NoC elements, such as, for example, routers, PCDC buffers, resizers, etc., are determined to advantageously minimize the overall slack while honoring latency sensitive traffic.

Embodiments of the present disclosure advantageously honor latency sensitivity of traffic while placing relocatable NoC elements and inserting protocol-level pipelines, appropriately compute bridge port and NoC element retiming bits (e.g., output registering on routers) to meet timing and other design constraints, honor clock uncertainty, flop-to-output delay, multi-clock domain and multi-power domain boundaries, provide congestion control based on in-built area models, directly reduce pipelines rather than slack to accelerate convergence with the correct number of pipelines in a path, and planarize the connectivity.

In many embodiments, determining the final locations for the relocatable NoC elements includes several initial determinations followed by a processing loop that repeats while a condition is true or until the condition is satisfied.

First, the NoC element energy value for each relocatable NoC element is determined. In many embodiments, the NoC element energy value for each relocatable NoC element is the sum of a neighborhood energy value for the relocatable NoC element, a connected energy value for the relocatable NoC element, a congestion energy value for the relocatable NoC element, and a traffic augmented energy value for the relocatable NoC element. Other embodiments may include combinations of one or more of the neighborhood, connected, congestion, and traffic augmented energy values.

The neighborhood energy value for the relocatable NoC element is the sum of an energy contribution from each adjacent relocatable NoC element, device and unrouteable area. In one embodiment, each energy contribution is given by Equation 1:

$$0 \text{ if } D > D_T, \text{ and}$$

$$K \cdot D \text{ if } D \leq D_T, \quad \text{Eq. 1}$$

where D is a distance from the relocatable NoC element to the adjacent relocatable NoC element, device or unrouteable area, $D_T$ is a threshold distance (e.g., 0.8, 1.25, etc., causing a one-cell gap between elements), and K is a constant (e.g., 1).

In one embodiment, the connected energy value for the relocatable NoC element is given by Equation 2:

$$M \cdot \text{round}(f_{port} \cdot D/d_{ns}) \quad \text{Eq. 2}$$

where M is a constant (e.g., 1 or 10), $f_{port}$ is the clock domain frequency in which the relocatable NoC element is located (e.g., 533 MHz), and $d_{ns}$ is the distance in millimeters that a signal travels in one nanosecond (e.g., 0.8 mm/ns, 1.25 mm/ns, etc.).

In one embodiment, the congestion energy value for the relocatable NoC element is given by Equation 3:

$$J \cdot RC \cdot NA_{Total} \quad \text{Eq. 3}$$

where J is a constant (e.g., 1), RC is a congestion ratio (e.g., 0.1, 0.3, etc.), and $NA_{Total}$ is a total number of adjacent relocatable NoC elements.

In one embodiment, the traffic augmented energy value is given by Equation 4:

$$L \cdot E_{NoC} \qquad \text{Eq. 4}$$

where L is a constant (e.g., 10, 100, etc.), and $E_{NoC}$ is a sum of the other energy values for the relocatable NoC element neighborhood, i.e., the neighborhood energy value, the connected energy value, and the congestion energy value.

Next, a system energy value is determined. The system energy value is the sum of the NoC element energy values for all of the relocatable NoC elements.

A system temperature value is then determined. Generally, the processing loop repeats while a condition is true (e.g., a "while" loop) or until the condition is satisfied (e.g., a "for" loop). In one embodiment, the processing loop is a "while" loop, the system temperature value has a large initial value which is decremented at the end of each processing loop iteration, and the processing loop repeats while the system temperature value is greater than a minimum temperature value (e.g., 1). In another embodiment, the processing loop is a "for" loop, the system temperature value has a large initial value which, after the initial iteration, is decremented before each processing loop iteration, and the processing loop repeats until the system temperature value is less than or equal to a minimum temperature value (e.g., 1). Other types of processing loops are also contemplated.

Generally, the system temperature value and the amount that the system temperature value is decremented determine the number of processing cycles or iterations that are performed by the processing loop. In one embodiment, the amount that the system temperature value is decremented is recursive and given by Equation 5:

$$t_{new} = t_{current} \cdot (1-r) \qquad \text{Eq. 5}$$

where $t_{new}$ is the new system temperature value, $t_{current}$ is the current system temperature value, and r is the decrement parameter (e.g., 0.003). For example, an initial system temperature value of 100, minimum temperature of 1 and r value of 0.003 produces 1532 iterations of the processing loop. Larger values of the initial system temperature yield more processing cycles; similarly, smaller decrement parameter values yield more processing cycles.

The processing loop includes several determinations which are repeatedly performed while the system temperature value is greater than a minimum temperature value.

At least one relocatable NoC element is selected based on the NoC element energy values. In one embodiment, the relocatable NoC element having the highest NoC element energy value is selected. In other embodiments, a number of relocatable NoC elements are selected. In these embodiments, an ordered list of relocatable NoC elements is generated by sorting the relocatable NoC elements based on descending NoC element energy values, and a number of relocatable NoC elements are selected from the ordered list based on the system temperature value and a total number of relocatable NoC elements. In one embodiment, the number of selected relocatable NoC elements is given by Equation 6:

$$\min(\text{ceil}(\exp(-1 \cdot 1/t) \cdot N_{Total}), N_{Total}) \qquad \text{Eq. 6}$$

where t is the system temperature value, and $N_{Total}$ is the total number of relocatable NoC elements. In one embodiment, a particular relocatable NoC element may be skipped if that element has already been relocated a maximum number of times.

A new location for each selected relocatable NoC element is determined, a new NoC element energy value for each selected relocatable NoC element is determined at the new location, and the NoC element energy values for any unselected relocatable NoC elements are determined.

A new system energy value is then determined. In certain embodiments, the new location is assigned to each selected relocatable NoC element when the new system energy value is less than a previous system energy value. In other embodiments, a probabilistic acceptance criteria determines whether to the assign the new location to each selected relocatable NoC element. In these embodiments, an acceptance probability value is determined based on the new system energy value, the previous system energy value and the system temperature value. For each selected relocatable NoC element, a probability value associated with the selected relocatable NoC element is randomly determined, and, when the probability value is less than the acceptance probability value, the new location is assigned to the selected relocatable NoC element. The setting of the acceptance probability value for the case in which the permutation leads to lesser energy means that such reduction-in-energy solutions are always accepted. In one embodiment, the acceptance probability value is given by Equation 7:

$$1 \text{ if } SE_{New} < SE_{Previous}, \text{ and}$$

$$\exp(-1 \cdot \text{float}(SE_{New} - SE_{Previous})/t) \text{ if } SE_{New} \geq SE_{Previous} \qquad \text{Eq. 7}$$

where t is the system temperature value, $SE_{New}$ is the new system energy value, and $SE_{Previous}$ is the previous system energy value.

Finally, the system temperature value is decremented, and the processing loop repeats while the system temperature value is greater than a minimum temperature value.

Additionally, any crossing paths between routers may be untangled. In one embodiment, for each path between two routers with relocatable NoC elements on either side, all of the relocatable NoC elements in the path are collected, a shortest maze-routed path is determined, all of the relocatable NoC elements are shifted to one side if that path is occupied, and, if the power domain is not available, then the relocatable NoC element is located in the nearest power domain boundary.

Figure 7A:
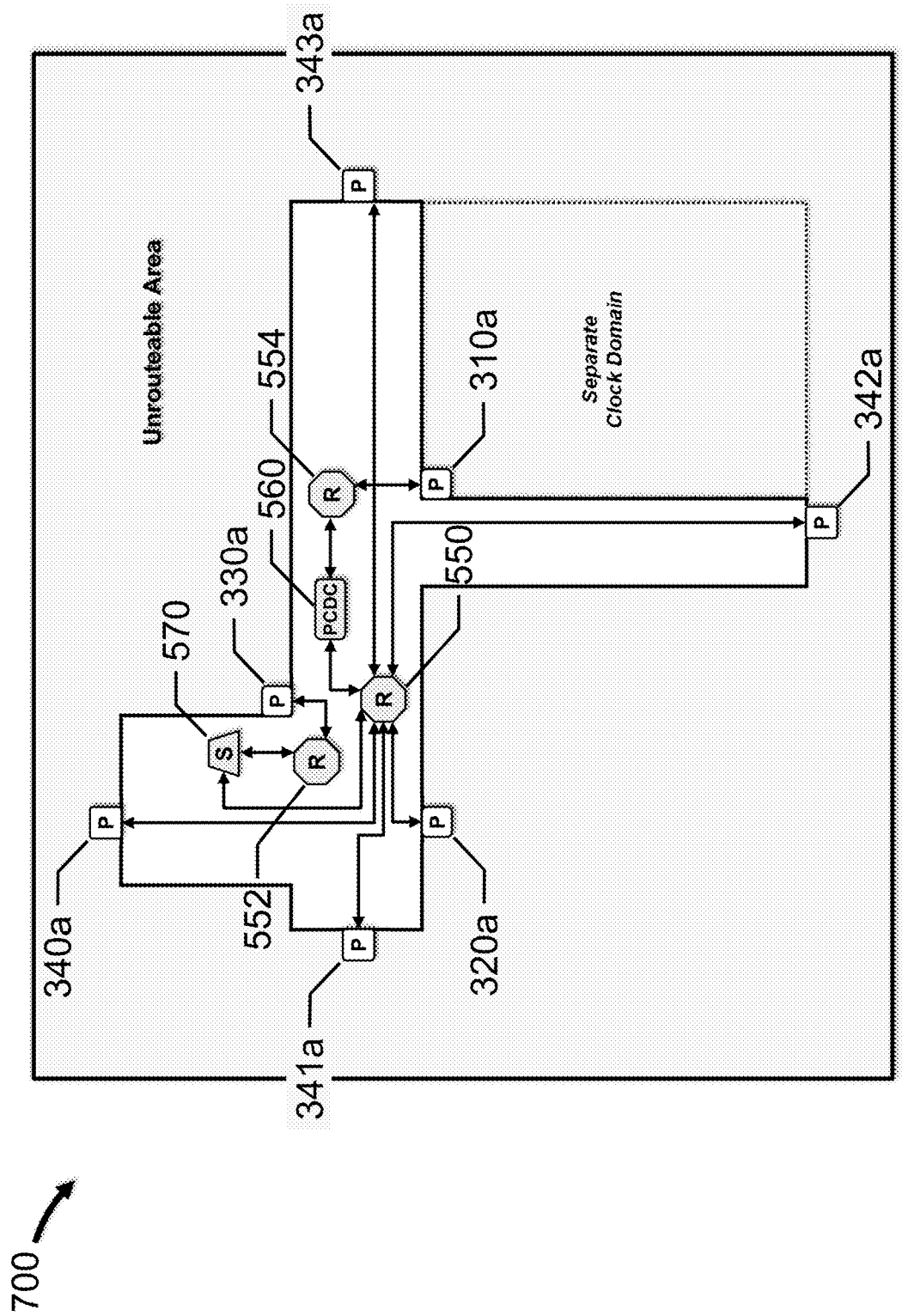
FIGS. 7A, 7B and 7C depict NoC topologies at different times during the determination of the final relocatable NoC element locations, in accordance with an embodiment of the present disclosure.
Figure 7B:
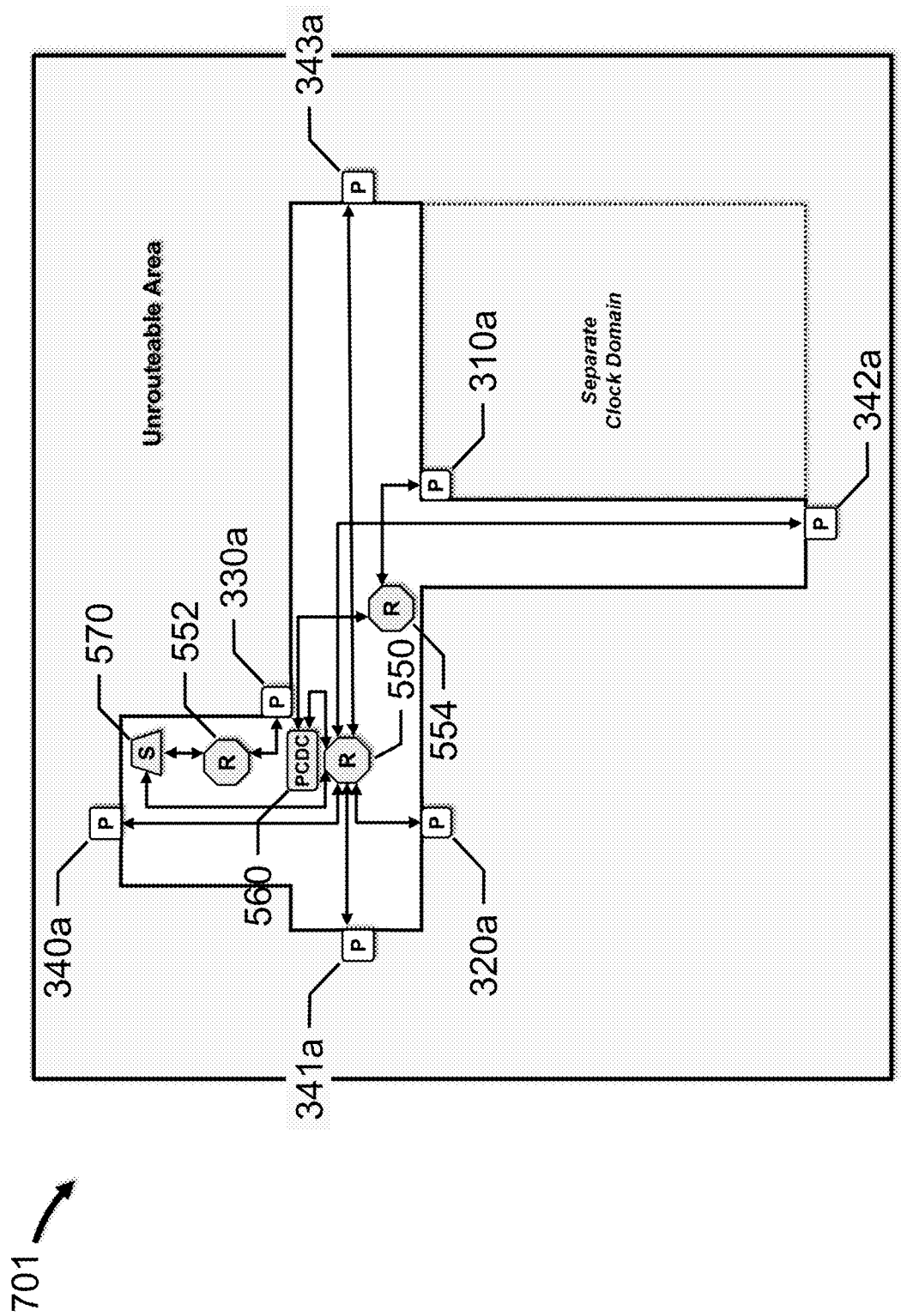
Figure 7C:
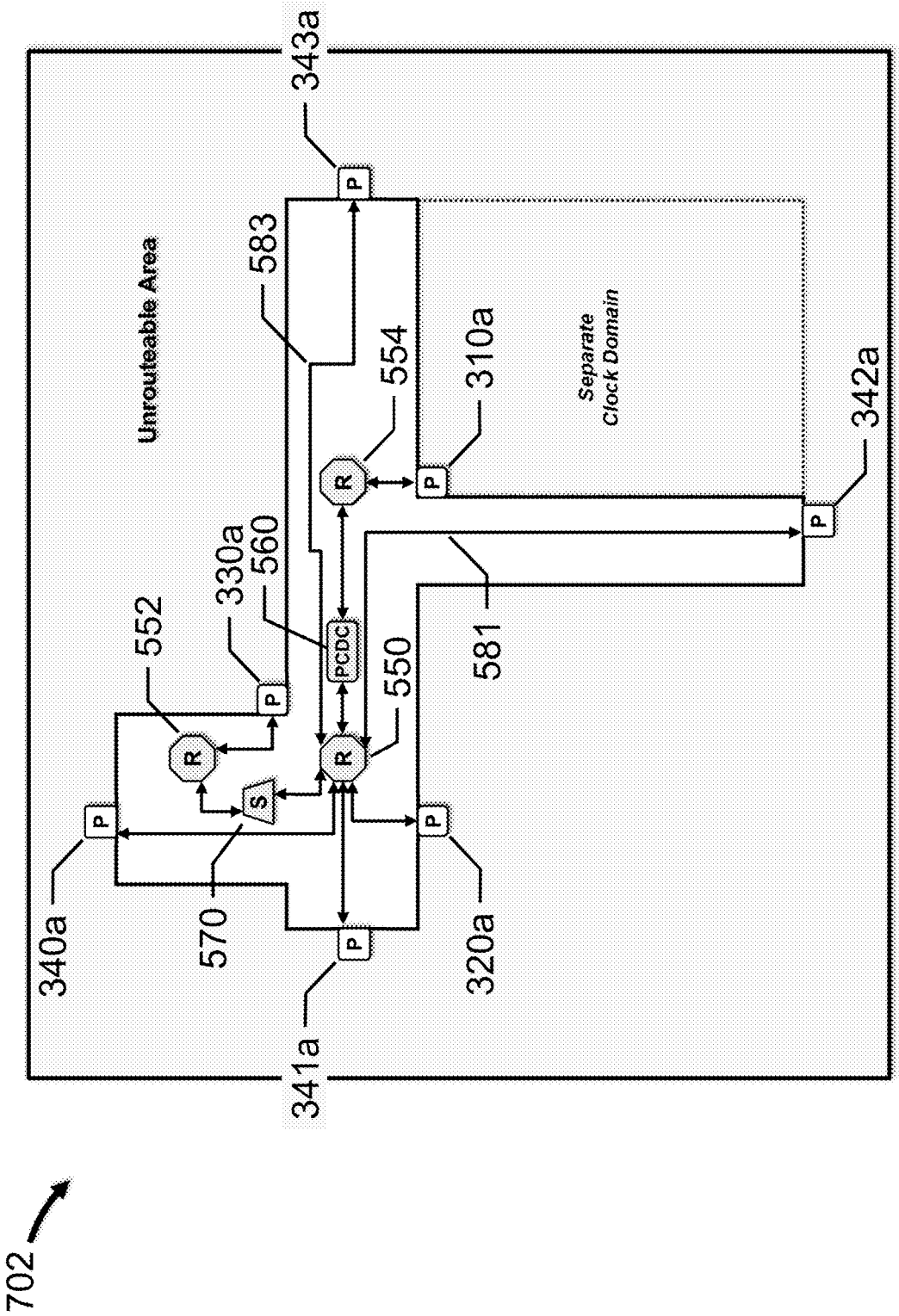

FIGS. 7A, 7B and 7C depict NoC topologies 700, 701 and 702 (respectively) at different times during the determination of the final relocatable NoC element locations, in accordance with an embodiment of the present disclosure. These times are depicted for ease of illustration, clarity and practicality, since the processing loop may repeat thousands, tens of thousands, hundreds or thousands, millions, etc., of times depending on the initial system temperature value the decrement amount.

FIG. 7A depicts NoC topology 700 after the processing loop has performed about one third of the total number of iterations. NoC topology 700 includes bridge ports 310a, 320a, 330a, 340a, 341a, 342a and 343a, and relocatable NoC elements including routers 550, 552 and 554, PCDC buffer 560 and resizer 570. The initial locations for the relocatable NoC elements are depicted in NoC topology 600 (FIG. 6), which are concentrated in one small portion of the available routable area. Due to the repulsive effect provided by the NoC element energy calculations, the relocatable NoC elements have been distributed over a much greater portion of the available routable area for NoC topology 700 during the initial one-third processing cycle period. Generally, the relocatable NoC elements have been distributed over about half of the available routable area.

FIG. 7B depicts NoC topology 701 after the processing loop has performed about two thirds of the total number of iterations. NoC topology 701 includes bridge ports 310a, 320a, 330a, 340a, 341a, 342a and 343a, and relocatable NoC elements including routers 550, 552 and 554, PCDC buffer 560 and resizer 570. The locations for the relocatable NoC elements of NoC topology 701 are now generally concentrated in the area between bridge ports 320a, 330a and 340a. Generally, the relocatable NoC elements have been distributed over about one quarter of the available routable area.

FIG. 7C depicts NoC topology 702 after the processing loop has completed the total number of iterations. NoC topology 702 includes bridge ports 310a, 320a, 330a, 340a, 341a, 342a and 343a, and relocatable NoC elements including routers 550, 552 and 554, PCDC buffer 560 and resizer 570. The locations for the relocatable NoC elements of NoC topology 702 are now distributed in the area between bridge ports 310a, 320a, 330a and 340a. Generally, the relocatable NoC elements have been well-distributed over about one third of the available routable area.

After the final locations of the relocatable NoC elements have been determined and any crossing paths untangled, protocol-level pipelines are advantageously inserted to keep the slack within appropriate limits, and to ensure that the length of each connection is equal to or less than the distance that a signal can propagate in one clock cycle, i.e., the maximum signal propagation distance. The maximum signal propagation distance depends on the SoC process technology, which may provide a general signal propagation distance metric, such as, for example, 0.8 mm/ns, 1.25 mm/ns, etc., and the frequency of the clock domain in which the connection is located, such as, for example, 533 MHz.

In the embodiment depicted in FIG. 7C, the length of connection 581 between bridge port 342a and router 550 is greater than the maximum signal propagation distance, and the arrival time of the signal transmitted from router 550 to bridge port 342a does not satisfy the timing constraints. Pipeline 580 is then added at an appropriate location to divide connection 581 between router 550 and bridge port 342a into two shorter connections to keep the slack within appropriate limits. While the lengths of the shorter connections do not need to be the same, each length does need to be less than the maximum signal propagation distance.

Similarly, the length of connection 583 between bridge port 343a and router 550 is greater than the maximum signal propagation distance, and the arrival time of the signal transmitted from router 550 to bridge port 343a does not satisfy the timing constraints. Pipeline 582 is then added at an appropriate location to divide connection 583 between router 550 and bridge port 343a into two shorter connections to keep the slack within appropriate limits. While the lengths of the shorter connections do not need to be the same, each length does need to be less than the maximum signal propagation distance.

At 290, NoC output specification 292 is generated, and then stored in memory 130.

Figure 8:
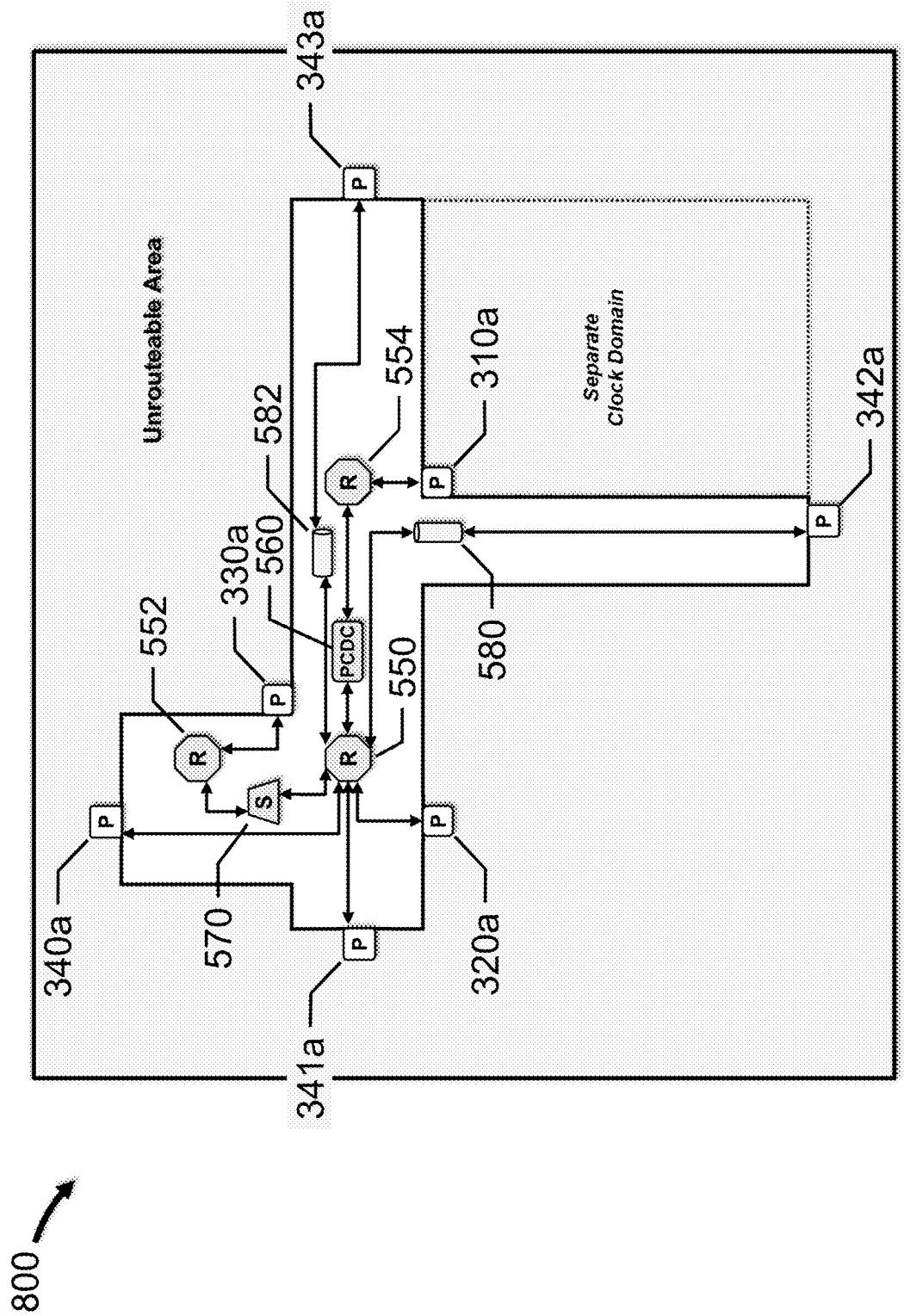
FIG. 8 depicts a graphical representation of a NoC output specification, in accordance with an embodiment of the present disclosure.

FIG. 8 depicts a graphical representation of NoC output specification 292, in accordance with an embodiment of the present disclosure. A user may view NoC 800 on display 152.

NoC 800 has the same NoC height, a NoC width and unrouteable areas as NoC 300, i.e., UAs 301, 302 and 303, device 310, device 320 and device 330. Device 310 (bridge port 310a) is connected to router 554, device 320 (bridge port 320a) is connected to router 550, and device 330 (bridge port 330a) is connected to router 552. Router 554 is connected to router 550 through PCDC buffer 560. Router 550 is connected to device 340 (bridge port 340a), device 341 (bridge port 341a), device 342 (bridge port 342a) through pipeline 580, device 343 (bridge port 343a) though pipeline 582, router 552 thorough resizer 570, and router 554 through PCDC buffer 560.

Additionally, NoC output specification 292 may be transmitted over network 20, provided to software modules 136 used by the NoC designer, etc. For example, NoC output specification 292 may be provided as input to a NoC fabrication process in a chip foundry. Reports 294 may also be generated, and then stored in memory 130. For example, reports 294 may contain the components used in the design (e.g., routers, resizers, PCDCs, pipelines, etc.), the traffic on each link, the link utilization, latencies across a path, etc.

Figure 9A:
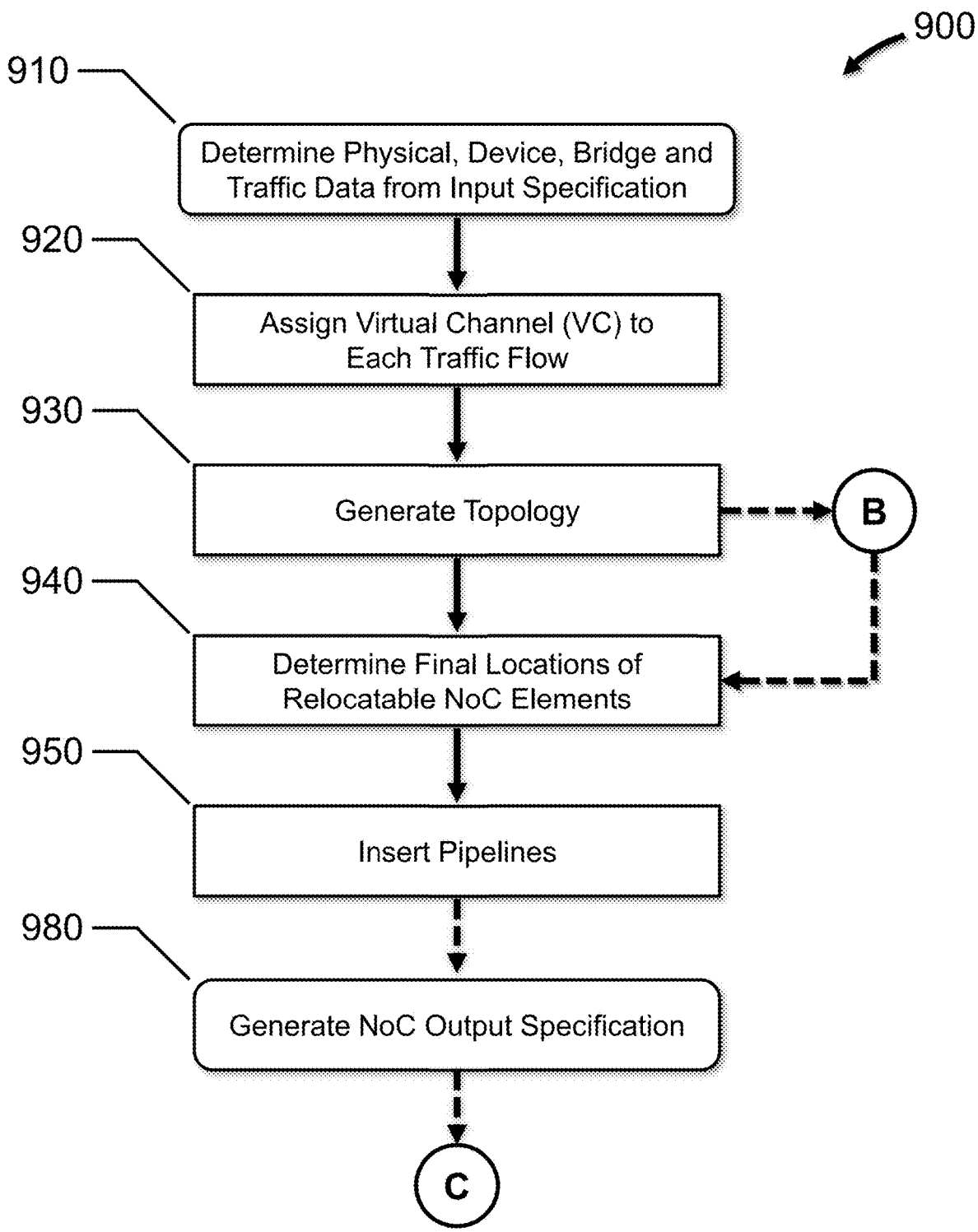
FIGS. 9A, 9B and 9C depict flow diagrams representing functionality associated with synthesizing a NoC, in accordance with an embodiment of the present disclosure.
Figure 9B:
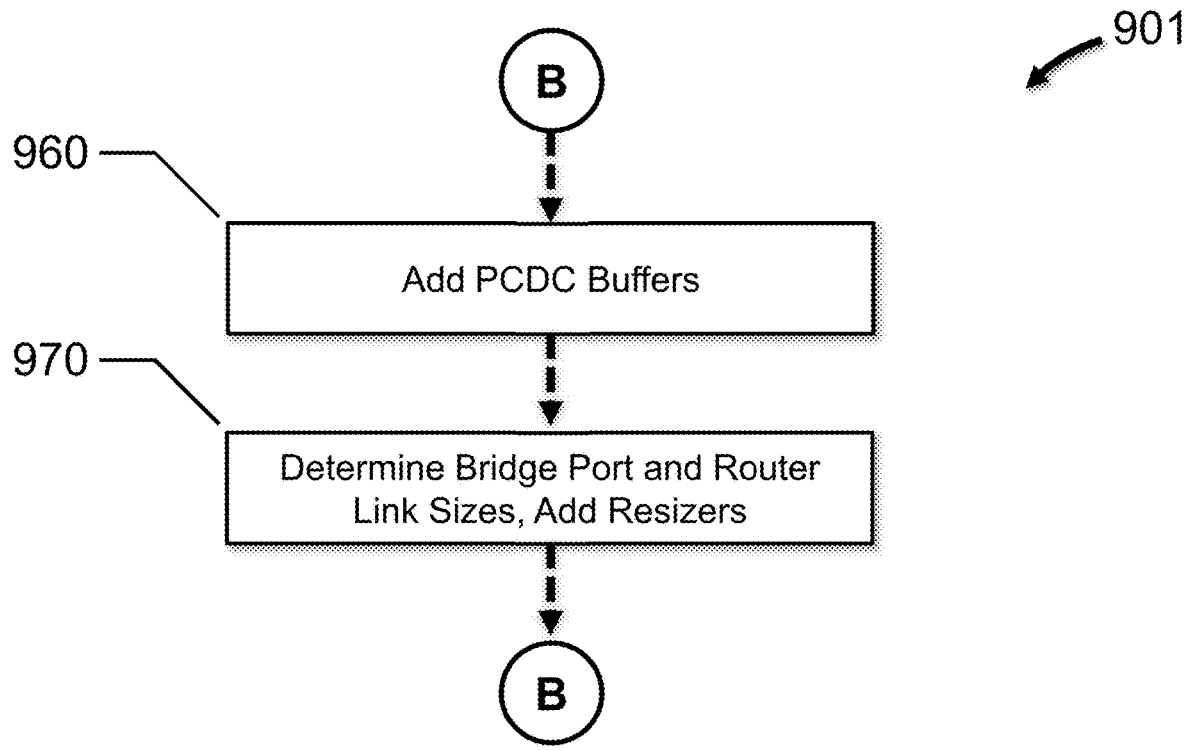
Figure 9C:
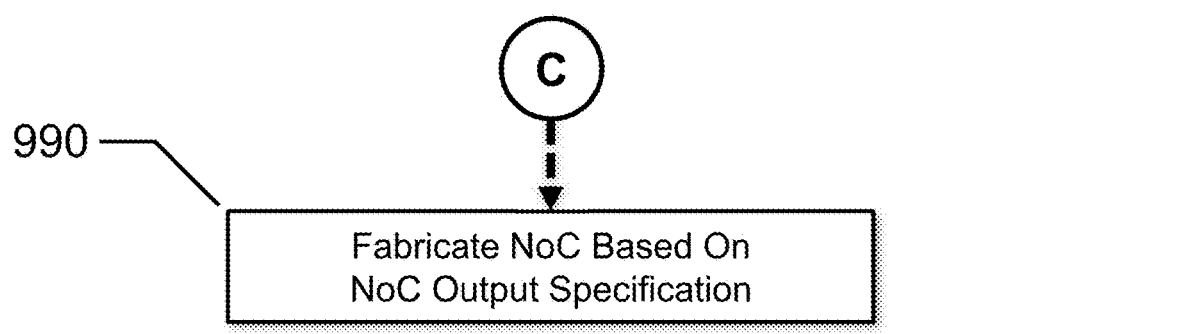

FIGS. 9A, 9B and 9C depict flow diagrams representing functionality associated with synthesizing a NoC, in accordance with embodiments of the present disclosure. FIG. 9A depicts flow diagram 900, FIG. 9B depicts flow diagram 901 and FIG. 9C depicts flow diagram 902; dotted connections indicate optional elements.

At 910, physical data, device data, bridge data and traffic data are determined based on an input specification for the NoC. The physical data include dimensions for the NoC. The device data include a plurality of devices, and each device has a location and dimensions. The bridge data include a plurality of bridge ports, and each bridge port is associated with one of the devices, and each bridge port has a location. The traffic data includes a plurality of traffic flows.

At 920, a VC is assigned to each traffic flow to create a plurality of VC assignments.

At 930, a topology is generated based on the physical data, the device data, the bridge data, the traffic data and the VC assignments. The topology includes the plurality of bridge ports, a plurality of routers and a plurality of connections. Each router has an initial location.

At 940, final locations for a plurality of relocatable NoC elements are determined based on NoC element energy values for the relocatable NoC elements. The plurality of relocatable NoC elements includes the routers.

At 950, pipeline and retiming components are added based on a timing parameter.

At 960, a PCDC buffer may be added to each connection that connects a bridge port or router in one clock domain and an adjacent bridge port or router in a different clock domain. Each PCDC buffer has an initial location, and the plurality of relocatable NoC elements includes the PCDC buffers.

At 970, a link size may be determined for each bridge port based on the bridge data and the traffic data, and a link size may be determined for each router. A resizer may be added between a bridge port and a router with different link sizes or between adjacent routers with different link sizes. Each resizer has an initial location, and the plurality of relocatable NoC elements includes the resizers.

At 980, an output specification for the NoC may be generated.

At 990, a NoC may be fabricated based on NoC output specification 292.

Embodiments of the present disclosure advantageously provide a computer-based method and system for synthesizing a Network-on-Chip (NoC). The embodiments described above and summarized below are combinable.

In one embodiment, a computer-based method for synthesizing a Network-on-Chip (NoC) is provided. Physical data, device data, bridge data and traffic data are determined based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows. A virtual channel (VC) is assigned to each traffic flow to create a plurality of VC assignments. A topology is generated based on the physical data, the device data, the bridge data, the traffic data and the VC assignments, the topology including the plurality of bridge ports, a plurality of routers and a plurality of connections, each router having an initial location. Final locations for a plurality of relocatable NoC elements are determined based on NoC element energy values for the relocatable NoC elements, the plurality of relocatable NoC elements including the routers. One or more protocol-level pipelines are inserted into one or more connections based on a timing parameter.

In another embodiment of the computer-based method, the method further includes adding a power clock domain crossing (PCDC) buffer to each connection that connects a bridge port or router in one clock domain and an adjacent bridge port or router in a different clock domain, each PCDC buffer having an initial location, where the plurality of relocatable NoC elements includes the PCDC buffers.

In another embodiment of the computer-based method, the method further includes determining a link size for each bridge port based on the bridge data and the traffic data; determining a link size for each router; and adding a resizer between a bridge port and a router with different link sizes or between adjacent routers with different link sizes, each resizer having an initial location, where the plurality of relocatable NoC elements includes the resizers.

In another embodiment of the computer-based method, the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element.

In another embodiment of the computer-based method, the neighborhood energy value for the relocatable NoC element is a sum of an energy contribution from each adjacent relocatable NoC element, device and unrouteable area, and each energy contribution is given by:

0 if $D > D_T$, and $K \cdot D$ if $D \leq D_T$, where D is a distance from the relocatable NoC element to the adjacent relocatable NoC element, device or unrouteable area, $D_T$ is a threshold distance, and K is a constant; the connected energy value for the relocatable NoC element is given by:

$M \cdot \text{round}(f_{port} \cdot D/d_{ns})$, where M is a constant, $f_{port}$ is a clock domain frequency in which the relocatable NoC element is located, and $d_{ns}$ is the distance in millimeters that a signal travels in one nanosecond; the congestion energy value for the relocatable NoC element is given by:

$J \cdot R_C \cdot NA_{Total}$, where J is a constant, $R_C$ is a congestion ratio, and $NA_{Total}$ is a total number of adjacent relocatable NoC elements; and the traffic augmented energy value is given by:

$L \cdot E_{NoC}$ where L is a constant and $E_{NoC}$ is a sum of the neighborhood energy value, the connected energy value, and the congestion energy value for the relocatable NoC element.

In another embodiment of the computer-based method, said determining the final locations for the plurality of relocatable NoC elements includes determining the NoC element energy value for each relocatable NoC element; determining a system energy value, the system energy value being a sum of the NoC element energy values for the relocatable NoC elements; determining a system temperature value; and while the system temperature value is greater than a minimum temperature value selecting at least one relocatable NoC element based on the NoC element energy values, determining a new location for each selected relocatable NoC element, determining a new NoC element energy value for each selected relocatable NoC element at the new location, determining the NoC element energy values for unselected relocatable NoC elements, determining a new system energy value, when the new system energy value is less than a previous system energy value, assigning the new location to the selected relocatable NoC element, and decrementing the system temperature value.

In another embodiment of the computer-based method, the relocatable NoC element having a highest NoC element energy value is selected.

In another embodiment of the computer-based method, said selecting at least one relocatable NoC element includes generating an ordered list of relocatable NoC elements by sorting the relocatable NoC elements based on descending NoC element energy values; and selecting a number of relocatable NoC elements from the ordered list based on the system temperature value and a total number of relocatable NoC elements.

In another embodiment of the computer-based method, the number of relocatable NoC elements is given by:

$\min(\text{ceil}(\exp(-1 \cdot 1/t) \cdot N_{Total}), N_{Total})$, where t is the system temperature value, and $N_{Total}$ is the total number of relocatable NoC elements.

In another embodiment of the computer-based method, where the method further includes determining an acceptance probability value based on the new system energy value, the previous system energy value and the system temperature value; and for each selected relocatable NoC element determining a probability value associated with the selected relocatable NoC element, and when the probability value is less than the acceptance probability value, assigning the new location to the selected relocatable NoC element.

In another embodiment of the computer-based method, the acceptance probability value is given by:

1 if $SE_{New} < SE_{Previous}$, and $\exp(-1 \cdot \text{float}(SE_{New} - SE_{Previous})/t)$ if $SE_{New} \geq SE_{Previous}$, where t is the system temperature value, $SE_{New}$ is the new system energy value, and $SE_{Previous}$ is the previous system energy value.

In another embodiment of the computer-based method, said generating the topology includes constructing a head of line (HoL) conflict graph (HCG) based on the traffic data and the VC assignments, including creating a plurality of nodes, each node representing a traffic flow, creating a plurality of edges, each edge representing an HoL conflict, and assigning a color to each HCG node to minimize HoL conflicts; constructing a plurality of traffic graphs (TGs) based on the physical data, the bridge data, the traffic data and the HCG, including constructing a TG for each color of the HCG;

generating a candidate topology for each TG, each candidate topology including at least two bridge ports, at least one router and at least two connections; merging the candidate topologies to create a merged candidate topology; and merging routers within the merged candidate topology.

In another embodiment of the computer-based method, the method further includes generating an output specification for the NoC; and fabricating a NoC based on the output specification.

In one embodiment, a system for synthesizing a Network-on-Chip (NoC) includes a storage element to store an input specification; and a processor, coupled to the storage element, configured to determine physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, assign a virtual channel (VC) to each traffic flow to create a plurality of VC assignments, generate a topology based on the physical data, the device data, the bridge data, the traffic data and the VC assignments, the topology including the plurality of bridge ports, a plurality of routers and a plurality of connections, each router having an initial location, determine final locations for a plurality of relocatable NoC elements based on NoC element energy values for the relocatable NoC elements, the plurality of relocatable NoC elements including the routers, and insert one or more protocol-level pipelines into one or more connections based on a timing parameter.

In another embodiment of the system, the processor is further configured to add a power clock domain crossing (PCDC) buffer to each connection that connects a bridge port or router in one clock domain and an adjacent bridge port or router in a different clock domain, each PCDC buffer having an initial location, and determine a link size for each bridge port based on the bridge data and the traffic data, determine a link size for each router, and add a resizer between a bridge port and a router with different link sizes or between adjacent routers with different link sizes, each resizer having an initial location; and the plurality of relocatable NoC elements includes the PCDC buffers and the resizers.

In another embodiment of the system, the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element; the neighborhood energy value for the relocatable NoC element is a sum of an energy contribution from each adjacent relocatable NoC element, device and unrouteable area, and each energy contribution is given by:

0 if $D > D_T$, and $K \cdot D$ if $D \leq D_T$, where D is a distance from the relocatable NoC element to the adjacent relocatable NoC element, device or unrouteable area, $D_T$ is a threshold distance, and K is a constant; the connected energy value for the relocatable NoC element is given by:

$M \cdot \text{round}(f_{port} \cdot D/d_{ns})$, where M is a constant, $f_{port}$ is a clock domain frequency in which the relocatable NoC element is located, and $d_{ns}$ is the distance in millimeters that a signal travels in one nanosecond; the congestion energy value for the relocatable NoC element is given by:

$J \cdot R_C \cdot NA_{Total}$, where J is a constant, $R_C$ is a congestion ratio, and $NA_{Total}$ is a total number of adjacent relocatable NoC elements; and the traffic augmented energy value is given by:

$L \cdot E_{NoC}$ where L is a constant and $E_{NoC}$ is a sum of the neighborhood energy value, the connected energy value, and the congestion energy value for the relocatable NoC element.

In another embodiment of the system, said determine the final locations for the plurality of relocatable NoC elements includes determine the NoC element energy value for each relocatable NoC element; determine a system energy value, the system energy value being a sum of the NoC element energy values for the relocatable NoC elements; determine a system temperature value; and while the system temperature value is greater than a minimum temperature value select at least one relocatable NoC element based on the NoC element energy values, determine a new location for each selected relocatable NoC element, determine a new NoC element energy value for each selected relocatable NoC element at the new location, determine the NoC element energy values for unselected relocatable NoC elements, determine a new system energy value, when the new system energy value is less than a previous system energy value, assign the new location to the selected relocatable NoC element, and decrement the system temperature value.

In another embodiment of the system, said select at least one relocatable NoC element includes select the relocatable NoC element having a highest NoC element energy value; or generate an ordered list of relocatable NoC elements by sorting the relocatable NoC elements based on descending NoC element energy values, and select a number of relocatable NoC elements from the ordered list based on the system temperature value and a total number of relocatable NoC elements, where the number of relocatable NoC elements is given by:

$\min(\text{ceil}(\exp(-1 \cdot 1/t) \cdot N_{Total}), N_{Total})$, where t is the system temperature value, and $N_{Total}$ is the total number of relocatable NoC elements.

In another embodiment of the system, the processor is further configured to determine an acceptance probability value based on the new system energy value, the previous system energy value and the system temperature value; and for each selected relocatable NoC element: determine a probability value associated with the selected relocatable NoC element, and when the probability value is less than the acceptance probability value, assign the new location to the selected relocatable NoC element.

In another embodiment of the system, the acceptance probability value is given by:

1 if $SE_{New} < SE_{Previous}$, and $\exp(-1 \cdot \text{float}(SE_{New} - SE_{Previous})/t)$ if $SE_{New} \geq SE_{Previous}$, where t is the system temperature value, $SE_{New}$ is the new system energy value, and $SE_{Previous}$ is the previous system energy value.

In one embodiment, an additional computer-based method for relocating elements for a Network-on-Chip (NoC) includes receiving a NoC topology including a plurality of bridge ports, a plurality of routers and a plurality of connections, each router having an initial location; determining final locations for a plurality of relocatable NoC elements based on NoC element energy values for the relocatable NoC elements, the plurality of relocatable NoC elements including the routers; and inserting one or more protocol-level pipelines into one or more connections based on a timing parameter.

In another embodiment of the additional computer-based method, the plurality of relocatable NoC elements includes one or more power clock domain crossing (PCDC) buffers and one or more resizers, each PCDC buffer having an initial location, and each resizer having an initial location.

In another embodiment of the additional computer-based method, the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element.

In another embodiment of the additional computer-based method, said determining the final locations for the plurality of relocatable NoC elements includes determining the NoC element energy value for each relocatable NoC element; determining a system energy value, the system energy value being a sum of the NoC element energy values for the relocatable NoC elements; determining a system temperature value; and while the system temperature value is greater than a minimum temperature value selecting at least one relocatable NoC element based on the NoC element energy values, determining a new location for each selected relocatable NoC element, determining a new NoC element energy value for each selected relocatable NoC element at the new location, determining the NoC element energy values for unselected relocatable NoC elements, determining a new system energy value, when the new system energy value is less than a previous system energy value, assigning the new location to the selected relocatable NoC element, and decrementing the system temperature value.

In another embodiment of the additional computer-based method, said selecting at least one relocatable NoC element includes selecting the relocatable NoC element having a highest NoC element energy value; or generating an ordered list of relocatable NoC elements by sorting the relocatable NoC elements based on descending NoC element energy values, and selecting a number of relocatable NoC elements from the ordered list based on the system temperature value and a total number of relocatable NoC elements.

In another embodiment of the additional computer-based method, the additional method further includes determining an acceptance probability value based on the new system energy value, the previous system energy value and the system temperature value; and for each selected relocatable NoC element determining a probability value associated with the selected relocatable NoC element, and when the probability value is less than the acceptance probability value, assigning the new location to the selected relocatable NoC element.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for synthesizing a Network-on-Chip (NoC), comprising:
    determining physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows;
    assigning a virtual channel (VC) to each traffic flow to create a plurality of VC assignments;
    generating a topology based on the physical data, the device data, the bridge data, the traffic data and the VC assignments, the topology including the plurality of bridge ports, a plurality of routers and a plurality of connections, each router having an initial location;
    determining final locations for a plurality of relocatable NoC elements based on NoC element energy values for the relocatable NoC elements, the plurality of relocatable NoC elements including the routers; and
    inserting one or more protocol-level pipelines into one or more connections based on a timing parameter.

2. The computer-based method according to claim 1, further comprising:
    adding a power clock domain crossing (PCDC) buffer to each connection that connects a bridge port or router in one clock domain and an adjacent bridge port or router in a different clock domain, each PCDC buffer having an initial location,
    where the plurality of relocatable NoC elements includes the PCDC buffers.

3. The computer-based method according to claim 1, further comprising:
    determining a link size for each bridge port based on the bridge data and the traffic data;
    determining a link size for each router; and
    adding a resizer between a bridge port and a router with different link sizes or between adjacent routers with different link sizes, each resizer having an initial location,
    where the plurality of relocatable NoC elements includes the resizers.

4. The computer-based method according to claim 1, where the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element.

5. The computer-based method according to claim 4, where:
    the neighborhood energy value for the relocatable NoC element is a sum of an energy contribution from each adjacent relocatable NoC element, device and unrouteable area, and each energy contribution is given by:

$0$ if $D > D_T$, and $K \cdot D$ if $D \leq D_T$, where D is a distance from the relocatable NoC element to the adjacent relocatable NoC element, device or unrouteable area, $D_T$ is a threshold distance, and K is a constant;
    the connected energy value for the relocatable NoC element is given by:

$M \cdot \text{round}(f_{port} \cdot D / d_{ns})$, where M is a constant, $f_{port}$ is a clock domain frequency in which the relocatable NoC element is located, and $d_{ns}$ is the distance in millimeters that a signal travels in one nanosecond;
    the congestion energy value for the relocatable NoC element is given by:

$J \cdot R_C \cdot NA_{Total}$, where J is a constant, $R_C$ is a congestion ratio, and $NA_{Total}$ is a total number of adjacent relocatable NoC elements; and
    the traffic augmented energy value is given by:

$L \cdot E_{NoC}$ where L is a constant and $E_{NoC}$ is a sum of the neighborhood energy value, the connected energy value, and the congestion energy value for the relocatable NoC element.

6. The computer-based method according to claim 4, where said determining the final locations for the plurality of relocatable NoC elements includes:
    determining the NoC element energy value for each relocatable NoC element;
    determining a system energy value, the system energy value being a sum of the NoC element energy values for the relocatable NoC elements;
    determining a system temperature value; and
    while the system temperature value is greater than a minimum temperature value:
        selecting at least one relocatable NoC element based on the NoC element energy values,
        determining a new location for each selected relocatable NoC element,
        determining a new NoC element energy value for each selected relocatable NoC element at the new location,
        determining the NoC element energy values for unselected relocatable NoC elements,
        determining a new system energy value,
        when the new system energy value is less than a previous system energy value, assigning the new location to the selected relocatable NoC element, and decrementing the system temperature value.

7. The computer-based method according to claim 6, where the relocatable NoC element having a highest NoC element energy value is selected.

8. The computer-based method according to claim 6, where said selecting at least one relocatable NoC element includes:
   generating an ordered list of relocatable NoC elements by sorting the relocatable NoC elements based on descending NoC element energy values; and
   selecting a number of relocatable NoC elements from the ordered list based on the system temperature value and a total number of relocatable NoC elements.

9. The computer-based method according to claim 8, where the number of relocatable NoC elements is given by:

$$\min(\operatorname{ceil}(\exp(-1 \cdot 1/t) \cdot N_{Total}), N_{Total}),$$

where t is the system temperature value, and $N_{Total}$ is the total number of relocatable NoC elements.

10. The computer-based method according to claim 6, further comprising:
    determining an acceptance probability value based on the new system energy value, the previous system energy value and the system temperature value; and
    for each selected relocatable NoC element:
       determining a probability value associated with the selected relocatable NoC element, and
       when the probability value is less than the acceptance probability value, assigning the new location to the selected relocatable NoC element.

11. The computer-based method according to claim 10, where the acceptance probability value is given by:

$$1 \text{ if } SE_{New} < SE_{Previous}, \text{ and}$$

$$\exp(-1 \cdot \operatorname{float}(SE_{New} - SE_{Previous})/t) \text{ if } SE_{New} \geq SE_{Previous},$$

where t is the system temperature value, $SE_{New}$ is the new system energy value, and $SE_{Previous}$ is the previous system energy value.

12. The computer-based method according to claim 1, where said generating the topology includes:
    constructing a head of line (HoL) conflict graph (HCG) based on the traffic data and the VC assignments, including:
       creating a plurality of nodes, each node representing a traffic flow,
       creating a plurality of edges, each edge representing an HoL conflict, and
       assigning a color to each HCG node to minimize HoL conflicts;
    constructing a plurality of traffic graphs (TGs) based on the physical data, the bridge data, the traffic data and the HCG, including constructing a TG for each color of the HCG;
    generating a candidate topology for each TG, each candidate topology including at least two bridge ports, at least one router and at least two connections;
    merging the candidate topologies to create a merged candidate topology; and
    merging routers within the merged candidate topology.

13. The computer-based method according to claim 12, further comprising:
    generating an output specification for the NoC; and
    fabricating a NoC based on the output specification.

14. A system for synthesizing a Network-on-Chip (NoC), comprising:
    a storage element to store an input specification; and
    a processor, coupled to the storage element, configured to:
       determine physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows,
       assign a virtual channel (VC) to each traffic flow to create a plurality of VC assignments,
       generate a topology based on the physical data, the device data, the bridge data, the traffic data and the VC assignments, the topology including the plurality of bridge ports, a plurality of routers and a plurality of connections, each router having an initial location,
       determine final locations for a plurality of relocatable NoC elements based on NoC element energy values for the relocatable NoC elements, the plurality of relocatable NoC elements including the routers, and
       insert one or more protocol-level pipelines into one or more connections based on a timing parameter.

15. The system according to claim 14, where:
    the processor is further configured to:
       add a power clock domain crossing (PCDC) buffer to each connection that connects a bridge port or router in one clock domain and an adjacent bridge port or router in a different clock domain, each PCDC buffer having an initial location, and
       determine a link size for each bridge port based on the bridge data and the traffic data, determine a link size for each router, and add a resizer between a bridge port and a router with different link sizes or between adjacent routers with different link sizes, each resizer having an initial location; and
    the plurality of relocatable NoC elements includes the PCDC buffers and the resizers.

16. The system according to claim 14, where:
    the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element;
    the neighborhood energy value for the relocatable NoC element is a sum of an energy contribution from each adjacent relocatable NoC element, device and unrouteable area, and each energy contribution is given by:

$$0 \text{ if } D > D_T, \text{ and}$$

$$K \cdot D \text{ if } D \leq D_T,$$

where D is a distance from the relocatable NoC element to the adjacent relocatable NoC element, device or unrouteable area, $D_T$ is a threshold distance, and K is a constant;
    the connected energy value for the relocatable NoC element is given by:

$$M \cdot \operatorname{round}(f_{port} \cdot D/d_{ns}),$$

where M is a constant, $f_{port}$ is a clock domain frequency in which the relocatable NoC element is located, and $d_{ns}$ is the distance in millimeters that a signal travels in one nanosecond;
    the congestion energy value for the relocatable NoC element is given by:

$$J \cdot R_C \cdot NA_{Total},$$

where J is a constant, $R_C$ is a congestion ratio, and $NA_{Total}$ is a total number of adjacent relocatable NoC elements; and the traffic augmented energy value is given by:

$$L \cdot E_{NoC}$$

where L is a constant and $E_{NoC}$ is a sum of the neighborhood energy value, the connected energy value, and the congestion energy value for the relocatable NoC element.

17. The system according to claim 16, where said determine the final locations for the plurality of relocatable NoC elements includes:
determine the NoC element energy value for each relocatable NoC element;
determine a system energy value, the system energy value being a sum of the NoC element energy values for the relocatable NoC elements;
determine a system temperature value; and
while the system temperature value is greater than a minimum temperature value:
select at least one relocatable NoC element based on the NoC element energy values,
determine a new location for each selected relocatable NoC element,
determine a new NoC element energy value for each selected relocatable NoC element at the new location,
determine the NoC element energy values for unselected relocatable NoC elements,
determine a new system energy value,
when the new system energy value is less than a previous system energy value, assign the new location to the selected relocatable NoC element, and
decrement the system temperature value.

18. The system according to claim 17, where said select at least one relocatable NoC element includes:
select the relocatable NoC element having a highest NoC element energy value; or
generate an ordered list of relocatable NoC elements by sorting the relocatable NoC elements based on descending NoC element energy values, and select a number of relocatable NoC elements from the ordered list based on the system temperature value and a total number of relocatable NoC elements, where the number of relocatable NoC elements is given by:

$$\min(\text{ceil}(\exp(-1 \cdot 1/t) \cdot N_{Total}), N_{Total}),$$

where t is the system temperature value, and $N_{Total}$ is the total number of relocatable NoC elements.

19. The system according to claim 17, where the processor is further configured to:
determine an acceptance probability value based on the new system energy value, the previous system energy value and the system temperature value; and
for each selected relocatable NoC element:
determine a probability value associated with the selected relocatable NoC element, and
when the probability value is less than the acceptance probability value, assign the new location to the selected relocatable NoC element.

20. The system according to claim 19, where the acceptance probability value is given by:

1 if $SE_{New} < SE_{Previous}$, and $\exp(-1 \cdot \text{float}(SE_{New} - SE_{Previous})/t)$ if $SE_{New} \geq SE_{Previous}$, where t is the system temperature value, $SE_{New}$ is the new system energy value, and $SE_{Previous}$ is the previous system energy value.

21. A computer-based method for relocating elements for a Network-on-Chip (NoC), comprising:
receiving a topology including the plurality of bridge ports, a plurality of routers and a plurality of connections, each router having an initial location;
determining final locations for a plurality of relocatable NoC elements based on NoC element energy values for the relocatable NoC elements, the plurality of relocatable NoC elements including the routers; and
inserting one or more protocol-level pipelines into one or more connections based on a timing parameter.

22. The computer-based method according to claim 21, where the plurality of relocatable NoC elements includes one or more power clock domain crossing (PCDC) buffers and one or more resizers, each PCDC buffer having an initial location, and each resizer having an initial location.

23. The computer-based method according to claim 22, where the NoC element energy value for each relocatable NoC element is a sum of a neighborhood energy value for the relocatable NoC element, a connected energy value for the relocatable NoC element, a congestion energy value for the relocatable NoC element, and a traffic augmented energy value for the relocatable NoC element.

24. The computer-based method according to claim 23, where said determining the final locations for the plurality of relocatable NoC elements includes:
determining the NoC element energy value for each relocatable NoC element;
determining a system energy value, the system energy value being a sum of the NoC element energy values for the relocatable NoC elements;
determining a system temperature value; and
while the system temperature value is greater than a minimum temperature value:
selecting at least one relocatable NoC element based on the NoC element energy values,
determining a new location for each selected relocatable NoC element,
determining a new NoC element energy value for each selected relocatable NoC element at the new location,
determining the NoC element energy values for unselected relocatable NoC elements,
determining a new system energy value,
when the new system energy value is less than a previous system energy value, assigning the new location to the selected relocatable NoC element, and
decrementing the system temperature value.

25. The computer-based method according to claim 24, where said selecting at least one relocatable NoC element includes:
selecting the relocatable NoC element having a highest NoC element energy value; or
generating an ordered list of relocatable NoC elements by sorting the relocatable NoC elements based on descending NoC element energy values, and selecting a number of relocatable NoC elements from the ordered list based on the system temperature value and a total number of relocatable NoC elements.

26. The computer-based method according to claim 24, further comprising:
determining an acceptance probability value based on the new system energy value, the previous system energy value and the system temperature value; and
for each selected relocatable NoC element:
determining a probability value associated with the selected relocatable NoC element, and when the probability value is less than the acceptance probability value, assigning the new location to the selected relocatable NoC element.

\* \* \* \* \*